US012735168B2

(12) United States Patent
Van Bavel et al.

(10) Patent No.: US 12,735,168 B2
(45) Date of Patent: Sep. 15, 2026

(54) AIRCRAFT DESIGN AND TECHNOLOGY

(71) Applicant: SIERRA NEVADA COMPANY, LLC, Sparks, NV (US)

(72) Inventors: Luc Van Bavel, Quebec City (CA); Michael Derman, Bend, OR (US); Jeffrey A. Gamon, Wichita, KS (US); Ian Gilchrist, Bellevue, WA (US); James Donn Hethcock, Jr., Colleyville, TX (US); Dieter Koehler, Powell Butte, OR (US); David W. Levy, Parker, CO (US); Michael Matarrese, Boulder, CO (US); Luke A. Thompson, Centennial, CO (US); Robert David Wyatt, Fort Worth, TX (US)

(73) Assignee: SIERRA NEVADA COMPANY, LLC, Sparks, NV (US)

( * ) Notice: Subject to any disclaimer, the term of this patent is extended or adjusted under 35 U.S.C. 154(b) by 463 days.

(21) Appl. No.: 16/223,011

(22) Filed: Dec. 17, 2018

(65) Prior Publication Data

US 2019/0185127 A1 Jun. 20, 2019

Related U.S. Application Data

(60) Provisional application No. 62/607,285, filed on Dec. 18, 2017.

(51) Int. Cl.

*B64C 3/10* (2006.01)
*B64C 1/00* (2006.01)

(Continued)

(52) U.S. Cl.

CPC .............. *B64C 1/0009* (2013.01); *B64C 1/26* (2013.01); *B64C 3/10* (2013.01); *B64C 5/02* (2013.01);

(Continued)

(58) Field of Classification Search

CPC ......... B64C 30/00; B64C 1/0009; B64C 3/10; B64C 9/22; B64C 23/06; B64C 5/02; B64D 2033/026; B64D 27/14

See application file for complete search history.

(56) References Cited

U.S. PATENT DOCUMENTS 1,376,785 A 5/1921 Sellmer
D97,652 S 11/1935 Swanson (Continued)

FOREIGN PATENT DOCUMENTS

EP 0891858 A2 1/1999
EP 1338506 A1 8/2003

(Continued)

OTHER PUBLICATIONS

Pike, John; F-5 Freedom Fighter / Tiger; Dec. 27, 1999; FAS Military Analysis Network; https://fas.org/man/dod-101/sys/ac/f-5.htm (Year: 1999).*

(Continued)

*Primary Examiner* — Richard Green
*Assistant Examiner* — Steven J Shur
(74) *Attorney, Agent, or Firm* — HOLLAND & HART LLP

(57) ABSTRACT

An aircraft designed to provide sustained G forces, with a relatively high steady angle of attack maneuverability using less thrust by balancing thrust and drag to sustain a high turn rate with dual low thrust engines using novel wing and fuselage designs. The aircraft includes a wing oriented laterally relative to the fuselage, at least one horizontal tail surface extending laterally from the fuselage and positioned rearward of the fixed wing, and at least one vertical tail surface extending upward from the fuselage. The first and second engines are mounted to the fuselage at locations positioned vertically below the fixed wing. The aircraft (Continued)

includes leading edge root extensions mounted to the fixed wing and the fuselage at a leading edge of the fixed wing, at least one dynamic slat mounted to a leading edge of the wing structure, and a chine formed in the fuselage along lateral sides thereof at a nose of the aircraft.

19 Claims, 19 Drawing Sheets

(51) Int. Cl.

| | |
|---|---|
| ***B64C 1/26*** | (2006.01) |
| ***B64C 5/02*** | (2006.01) |
| ***B64C 9/22*** | (2006.01) |
| ***B64D 27/14*** | (2006.01) |
| *B64C 39/00* | (2023.01) |

(52) U.S. Cl.

CPC ................ *B64C 9/22* (2013.01); *B64D 27/14* (2013.01); *B64C 39/00* (2013.01)

(56) References Cited

U.S. PATENT DOCUMENTS

| | | | | |
|---|---|---|---|---|
| 2,166,564 | A | 7/1939 | Atwood et al. | |
| D133,634 | S | 9/1942 | Huzzard | |
| D136,664 | S | 11/1943 | White | |
| D143,864 | S | 2/1946 | Northrop | |
| 2,501,920 | A | 3/1950 | Steigel | |
| 2,700,632 | A | 1/1955 | Ackerlind | |
| 2,938,680 | A | 5/1960 | Greene et al. | |
| 3,017,139 | A | 1/1962 | Binder | |
| D192,583 | S | 4/1962 | Walker et al. | |
| 3,049,320 | A | 8/1962 | Fletcher | |
| D194,645 | S | 2/1963 | Raspet | |
| D197,933 | S | 4/1964 | Sumner | |
| D201,284 | S | 6/1965 | Bross et al. | |
| 3,310,262 | A * | 3/1967 | Robins | B64C 30/00 244/45 R |
| 3,360,217 | A | 12/1967 | Trotter | |
| 3,392,225 | A | 7/1968 | Phelan | |
| 3,415,467 | A | 12/1968 | Barringer | |
| 3,438,597 | A | 4/1969 | Kasper | |
| D218,856 | S | 9/1970 | Fellers | |
| D218,857 | S | 9/1970 | Fellers et al. | |
| 3,564,134 | A | 2/1971 | Rue et al. | |
| D220,982 | S | 6/1971 | Webb | |
| D221,696 | S | 8/1971 | Krivka | |
| D231,603 | S | 5/1974 | Krivka | |
| D231,604 | S | 5/1974 | Krivka | |
| 3,916,560 | A | 11/1975 | Becker | |
| 4,008,867 | A * | 2/1977 | Kaniut | B64C 3/00 244/211 |
| D246,168 | S | 10/1977 | Landrus | |
| 4,206,895 | A | 6/1980 | Olez | |
| D256,347 | S | 8/1980 | McComas | |
| D256,905 | S | 9/1980 | McComas et al. | |
| D257,338 | S | 10/1980 | McComas et al. | |
| 4,304,376 | A | 12/1981 | Hilton | |
| D264,454 | S | 5/1982 | Snyder | |
| 4,372,507 | A | 2/1983 | Denniston | |
| 4,415,132 | A | 11/1983 | Shirk | |
| D274,510 | S | 7/1984 | McComas et al. | |
| D281,680 | S | 12/1985 | Henderson | |
| 4,569,493 | A | 2/1986 | Burhans, Jr. | |
| 4,662,587 | A | 5/1987 | Whitener | |
| 4,687,691 | A | 8/1987 | Kay | |
| 4,710,708 | A | 12/1987 | Rorden et al. | |
| 4,712,352 | A | 12/1987 | Low | |
| D298,026 | S | 10/1988 | Judge | |
| 4,811,540 | A | 3/1989 | Kallies et al. | |
| 4,869,443 | A | 9/1989 | Skow | |
| 4,896,846 | A | 1/1990 | Strom | |
| 4,966,802 | A | 10/1990 | Hertzberg | |
| 4,979,699 | A | 12/1990 | Tindell | |
| 5,039,032 | A | 8/1991 | Rudolph | |
| D319,805 | S | 9/1991 | Wiegert | |
| D323,315 | S | 1/1992 | Haga | |
| D326,255 | S | 5/1992 | Graham et al. | |
| 5,111,400 | A | 5/1992 | Yoder | |
| 5,115,996 | A | 5/1992 | Moller | |
| 5,118,052 | A | 6/1992 | Alvarez | |
| D332,080 | S | 12/1992 | Sandusky, Jr. et al. | |
| 5,192,037 | A | 3/1993 | Moorefield | |
| 5,274,846 | A | 1/1994 | Kolsky | |
| 5,379,969 | A | 1/1995 | Marx et al. | |
| D356,990 | S | 4/1995 | Weir et al. | |
| 5,407,150 | A | 4/1995 | Sadleir | |
| 5,425,515 | A | 6/1995 | Hirose | |
| 5,437,936 | A | 8/1995 | Johnson | |
| 5,460,865 | A | 10/1995 | Tsotsis | |
| 5,496,001 | A | 3/1996 | Skow | |
| D371,105 | S | 6/1996 | Graham et al. | |
| 5,567,500 | A | 10/1996 | Marshall et al. | |
| 5,574,648 | A | 11/1996 | Pilley | |
| 5,716,032 | A | 2/1998 | McIngvale | |
| D392,937 | S | 3/1998 | Brichard et al. | |
| 5,735,486 | A | 4/1998 | Piening et al. | |
| 5,842,666 | A * | 12/1998 | Gerhardt | B64C 30/00 244/15 |
| 5,890,079 | A | 3/1999 | Levine | |
| 5,922,446 | A | 7/1999 | Piening et al. | |
| 5,924,649 | A | 7/1999 | Piening et al. | |
| 5,927,645 | A | 7/1999 | Latz | |
| 5,984,229 | A | 11/1999 | Hollowell et al. | |
| D418,105 | S | 12/1999 | Margaritoff | |
| D418,805 | S | 1/2000 | Cycon et al. | |
| D431,522 | S | 10/2000 | Fujino | |
| 6,147,980 | A | 11/2000 | Yee et al. | |
| 6,173,159 | B1 | 1/2001 | Wright et al. | |
| 6,176,451 | B1 | 1/2001 | Drymon | |
| D439,876 | S | 4/2001 | Simonov et al. | |
| 6,260,797 | B1 | 7/2001 | Palmer | |
| D446,764 | S | 8/2001 | Panatov et al. | |
| 6,338,011 | B1 | 1/2002 | Furst et al. | |
| 6,355,337 | B1 | 3/2002 | Piening et al. | |
| 6,394,722 | B1 | 5/2002 | Kunt et al. | |
| D458,577 | S | 6/2002 | Han | |
| D464,604 | S | 10/2002 | Jamgarov | |
| D467,217 | S | 12/2002 | Andreyko | |
| D468,255 | S | 1/2003 | Gopalaswami | |
| 6,520,706 | B1 | 2/2003 | McKague, Jr. et al. | |
| 6,677,888 | B2 | 1/2004 | Roy | |
| 6,799,114 | B2 | 9/2004 | Etnyre | |
| 6,806,829 | B2 | 10/2004 | Smith et al. | |
| 6,857,601 | B2 | 2/2005 | Akahori | |
| 6,908,061 | B2 | 6/2005 | Akahori | |
| 6,995,688 | B2 | 2/2006 | Reynolds | |
| 7,037,568 | B1 | 5/2006 | Rogers et al. | |
| 7,070,146 | B2 * | 7/2006 | Morgenstern | B64C 9/36 244/35 A |
| 7,130,741 | B2 | 10/2006 | Bodin et al. | |
| 7,228,232 | B2 | 6/2007 | Bodin et al. | |
| 7,252,263 | B1 | 8/2007 | Hagemeister et al. | |
| 7,269,513 | B2 | 9/2007 | Herwitz | |
| D613,202 | S | 4/2010 | Rodriquez et al. | |
| D621,774 | S | 8/2010 | Betsch | |
| 7,782,256 | B2 | 8/2010 | Smith | |
| D629,737 | S | 12/2010 | Betsch | |
| D649,506 | S | 11/2011 | Morelli | |
| D651,156 | S | 12/2011 | Gundlach | |
| 8,089,033 | B2 | 1/2012 | Zank et al. | |
| D665,331 | S | 8/2012 | Sands | |
| 8,342,447 | B2 * | 1/2013 | Etling | B64C 9/00 244/90 R |
| 8,444,082 | B1 | 5/2013 | Foch | |
| D690,254 | S | 9/2013 | Manzhelii | |
| 8,544,794 | B2 | 10/2013 | Ciprian | |
| D708,563 | S | 7/2014 | Colten | |
| D710,782 | S | 8/2014 | Cummings | |
| D713,321 | S | 9/2014 | Cummings | |
| D713,774 | S | 9/2014 | Tritschler et al. | |
| D717,227 | S | 11/2014 | Harzberger et al. | |

(56) References Cited

U.S. PATENT DOCUMENTS

| | | | |
|---|---|---|---|
| D729,694 | S | 5/2015 | Earon |
| D734,402 | S | 7/2015 | Reznik |
| D739,807 | S | 9/2015 | Strand et al. |
| 9,156,239 | B2 | 10/2015 | Hethcock et al. |
| 9,168,996 | B2 | 10/2015 | Haensch et al. |
| D743,868 | S | 11/2015 | Cummings et al. |
| 9,180,974 | B2 * | 11/2015 | Pogosyan .............. B64D 33/02 |
| 9,284,046 | B2 | 3/2016 | Lucchesini et al. |
| 9,387,926 | B2 | 7/2016 | Sommer |
| 9,452,820 | B1 | 9/2016 | Wirth |
| 9,505,484 | B1 | 11/2016 | Al-Sabah |
| 9,507,346 | B1 | 11/2016 | Levinson et al. |
| 9,527,596 | B1 | 12/2016 | Adams |
| 9,545,991 | B1 | 1/2017 | Alley et al. |
| 9,681,527 | B2 | 6/2017 | Foltz et al. |
| 9,713,913 | B2 | 7/2017 | Hethcock et al. |
| D795,160 | S | 8/2017 | Koppenwallner |
| 9,725,155 | B2 * | 8/2017 | Miller ....................... B64C 1/40 |
| 9,777,502 | B2 | 10/2017 | Curlander et al. |
| 9,783,284 | B2 | 10/2017 | Townsend et al. |
| D801,856 | S | 11/2017 | Zhou |
| D803,724 | S | 11/2017 | Zhou |
| 9,815,545 | B1 | 11/2017 | Steer |
| D807,273 | S | 1/2018 | Koppenwallner |
| D808,328 | S | 1/2018 | Ivans et al. |
| D809,970 | S | 2/2018 | Zhou |
| D810,621 | S | 2/2018 | Sadek |
| D813,143 | S | 3/2018 | Belik et al. |
| D824,804 | S | 8/2018 | Tian |
| 10,042,359 | B1 | 8/2018 | Konrardy et al. |
| 10,046,850 | B2 | 8/2018 | Gamble et al. |
| 10,124,880 | B1 | 11/2018 | Ellzey et al. |
| 10,124,890 | B2 | 11/2018 | Sada-Salinas et al. |
| 10,207,793 | B2 | 2/2019 | Gonzalez et al. |
| 10,706,729 | B2 | 7/2020 | Cao et al. |
| 10,710,710 | B2 | 7/2020 | Price |
| 10,974,809 | B2 | 4/2021 | Finklea et al. |
| 2001/0031350 | A1 | 10/2001 | Day et al. |
| 2002/0066825 | A1 | 6/2002 | Miralles et al. |
| 2002/0075179 | A1 | 6/2002 | Hudson et al. |
| 2003/0089820 | A1 | 5/2003 | Martorana et al. |
| 2003/0094536 | A1 | 5/2003 | Labiche |
| 2003/0114115 | A1 | 6/2003 | Overy et al. |
| 2004/0011927 | A1 | 1/2004 | Christman et al. |
| 2004/0048027 | A1 | 3/2004 | Hayes et al. |
| 2004/0148067 | A1 | 7/2004 | Griffith et al. |
| 2004/0159227 | A1 | 8/2004 | Richards |
| 2004/0232285 | A1 | 11/2004 | Akahori |
| 2005/0029402 | A1 | 2/2005 | Lucchesini et al. |
| 2005/0045763 | A1 | 3/2005 | Morgenstern et al. |
| 2005/0116116 | A1 | 6/2005 | Morgenstern |
| 2005/0121555 | A1 | 6/2005 | Morgenstern et al. |
| 2005/0200501 | A1 | 9/2005 | Smith |
| 2005/0274845 | A1 | 12/2005 | Miller et al. |
| 2006/0032978 | A1 | 2/2006 | Matos et al. |
| 2006/0185305 | A1 | 8/2006 | Schaffer |
| 2006/0197700 | A1 | 9/2006 | Stevens et al. |
| 2006/0253254 | A1 | 11/2006 | Herwitz |
| 2007/0222665 | A1 | 9/2007 | Koeneman |
| 2007/0252760 | A1 | 11/2007 | Smith et al. |
| 2007/0262207 | A1 | 11/2007 | Morgenstern et al. |
| 2008/0033604 | A1 | 2/2008 | Margolin |
| 2008/0055149 | A1 | 3/2008 | Rees et al. |
| 2008/0158041 | A1 | 7/2008 | Crudeli et al. |
| 2008/0191942 | A1 | 8/2008 | Smith et al. |
| 2008/0201024 | A1 | 8/2008 | Matos |
| 2008/0213034 | A1 | 9/2008 | Wood et al. |
| 2008/0215204 | A1 | 9/2008 | Roy et al. |
| 2008/0221745 | A1 | 9/2008 | Diamandis et al. |
| 2008/0243314 | A1 | 10/2008 | Ridenour |
| 2008/0255711 | A1 | 10/2008 | Matos |
| 2009/0012657 | A1 | 1/2009 | Knotts et al. |
| 2009/0026804 | A1 | 1/2009 | Ciprian |
| 2009/0202780 | A1 | 8/2009 | Loszewski et al. |
| 2009/0206196 | A1 | 8/2009 | Parks et al. |
| 2009/0222148 | A1 | 9/2009 | Knotts et al. |
| 2009/0302151 | A1 | 12/2009 | Holmes |
| 2010/0004799 | A1 | 1/2010 | Drouin et al. |
| 2010/0006702 | A1 | 1/2010 | Fogarty et al. |
| 2010/0051742 | A1 | 3/2010 | Schweighart et al. |
| 2010/0224732 | A1 | 9/2010 | Olson et al. |
| 2010/0264260 | A1 | 10/2010 | Hammerquist |
| 2010/0320325 | A1 | 12/2010 | Parikh et al. |
| 2011/0095572 | A1 | 4/2011 | Wary |
| 2011/0130913 | A1 | 6/2011 | Duggan et al. |
| 2011/0135887 | A1 | 6/2011 | Saff et al. |
| 2011/0315300 | A1 | 12/2011 | Weidmann et al. |
| 2012/0021165 | A1 | 1/2012 | Hethcock et al. |
| 2012/0043429 | A1 | 2/2012 | Tracy et al. |
| 2012/0205490 | A1 | 8/2012 | Whitehouse et al. |
| 2012/0234979 | A1 | 9/2012 | Smith |
| 2012/0280080 | A1 | 11/2012 | Lubenow et al. |
| 2012/0292436 | A1 | 11/2012 | Karem |
| 2013/0196593 | A1 | 8/2013 | Roper et al. |
| 2013/0299636 | A1 | 11/2013 | Durand et al. |
| 2014/0070056 | A1 | 3/2014 | Merlo et al. |
| 2014/0120298 | A1 | 5/2014 | Thiagarajan et al. |
| 2014/0141769 | A1 | 5/2014 | Brisebois et al. |
| 2014/0145027 | A1 | 5/2014 | Pogosyan et al. |
| 2014/0209744 | A1 | 7/2014 | Marcoe et al. |
| 2014/0265043 | A1 | 9/2014 | Oldroyd et al. |
| 2014/0281534 | A1 | 9/2014 | Mccormack et al. |
| 2014/0293497 | A1 | 10/2014 | Foltz et al. |
| 2014/0295123 | A1 | 10/2014 | Mizuno et al. |
| 2014/0301856 | A1 | 10/2014 | Oldroyd et al. |
| 2015/0008280 | A1 | 1/2015 | Smoker |
| 2015/0032293 | A1 | 1/2015 | O'Neill et al. |
| 2015/0036514 | A1 | 2/2015 | Zhu et al. |
| 2015/0102155 | A1 | 4/2015 | Krastev |
| 2015/0174819 | A1 | 6/2015 | Hethcock et al. |
| 2015/0266578 | A1 | 9/2015 | Elkins et al. |
| 2015/0293845 | A1 | 10/2015 | Hsu et al. |
| 2015/0360764 | A1 | 12/2015 | Eales |
| 2015/0362005 | A1 | 12/2015 | Meyers |
| 2016/0137307 | A1 * | 5/2016 | Fernandez ............. B64D 31/06 701/3 |
| 2016/0155339 | A1 | 6/2016 | Saad et al. |
| 2016/0185449 | A1 | 6/2016 | Baker |
| 2016/0266733 | A1 | 9/2016 | Alon et al. |
| 2016/0311190 | A1 | 10/2016 | Hundley et al. |
| 2016/0340021 | A1 | 11/2016 | Zhang et al. |
| 2016/0347476 | A1 | 12/2016 | Andryukov |
| 2017/0001724 | A1 | 1/2017 | Yates |
| 2017/0182730 | A1 | 6/2017 | Kendrick et al. |
| 2017/0225769 | A1 | 8/2017 | Carlson et al. |
| 2017/0355441 | A1 | 12/2017 | Winkelmann et al. |
| 2017/0369150 | A1 | 12/2017 | Finklea et al. |
| 2018/0050788 | A1 | 2/2018 | Kismarton et al. |
| 2018/0072400 | A1 | 3/2018 | Deobald et al. |
| 2018/0136651 | A1 | 5/2018 | Levinson et al. |
| 2018/0201008 | A1 | 7/2018 | Pierce et al. |
| 2018/0229443 | A1 | 8/2018 | Pham et al. |
| 2018/0231977 | A1 | 8/2018 | Uno |
| 2019/0011912 | A1 | 1/2019 | Lockwood et al. |
| 2019/0186918 | A1 | 6/2019 | Suen et al. |
| 2019/0232602 | A1 | 8/2019 | Wolf et al. |
| 2020/0012274 | A1 | 1/2020 | Kamiya et al. |
| 2020/0020412 | A1 | 1/2020 | Biberidis et al. |
| 2020/0254713 | A1 | 8/2020 | Oldenburg et al. |
| 2020/0266857 | A1 | 8/2020 | Hwang et al. |
| 2020/0314916 | A1 | 10/2020 | Park et al. |
| 2020/0404569 | A1 | 12/2020 | Cho et al. |
| 2021/0061027 | A1 | 3/2021 | Da et al. |
| 2021/0206382 | A1 | 7/2021 | Nakada |
| 2022/0089181 | A1 | 3/2022 | Gross et al. |
| 2022/0126864 | A1 | 4/2022 | Moustafa et al. |

FOREIGN PATENT DOCUMENTS

| | | | |
|---|---|---|---|
| EP | 1884908 | A2 | 2/2008 |
| EP | 2708463 | A1 | 3/2014 |
| WO | 2014/065718 | A1 | 5/2014 |

(56) References Cited

FOREIGN PATENT DOCUMENTS

WO 2016/209889 A1 12/2016
WO 2017/134459 A1 8/2017

OTHER PUBLICATIONS

European Aviation Safety Agency; Type-Certificate Data Sheet; Nov. 17, 2015 (Year: 2015).*
Lachmann, C; Experiments with Slotted Wings; Nov. 1921; National Advisory Committee for Aeronautics; No. 71 (Year: 1921).*
Drew, James; USAF reaffirms ambitions T-X sustained-g requirement; Jul. 11, 2015; FlightGlobal.com (Year: 2015).*
Airpower Classics; F-5; Dec. 2012; Air Force Magazine; p. 72 (Year: 2012).*
Wikipedia, Strake (aeronautics), Aug. 9, 2017 (Year: 2017).*
Wikipedia, Mikoyan MIG-29, Apr. 4, 2022 (Year: 2022).*
Wikipedia, Cobra maneuver, Mar. 13, 2022 (Year: 2022).*
Burkhard Domke, MiG-29G Fulcrum-A, Jun. 2000; https://b-domke.de/AviationImages/Fulcrum/3524.html (Year: 2000).*
Colin Cutler, Here's How Leading Edge Slats Get You Off The Ground, Jul. 26, 2018, boldmethod; https://www.boldmethod.com/learn-to-fly/aircraft-systems/here-is-how-leading-edge-slats-work-to-get-you-off-the-ground/ (Year: 2018).*
Nikolic, Vojin R. "Movable Tip Strakes and Wing Aerodynamics." Journal of Aircraft, vol. 42, No. 6, 2005, pp. 1418-1426, https://doi.org/10.2514/1.4615. (Year: 2005).*
Bekdil, B. E., "Turkey Chooses Indigenous Jet-engine Version Basic Trainer Aircraft," Military and Commercial Technology, available at https://thaimilitaryandasianregion.blogspot.com/2017/11/turkey-chooses-indigenous-jet-engine.html, Nov. 23, 2017 (2 pp.).
Butler, A., "Textron Unveils Scorpion Light Attack, Recce Jet," Aviation Week, available at https://aviationweek.com/defense-space/textron-unveils-scorpion-light-attack-recce-jet, Sep. 16, 2013 (4 pp.).
Hillaker, H. J., "Design Conccpt and Rationale . . . for YF-16," Prescntation, availablc at https://www.codeonemagazine.com/f16 article.html?item id=131 1972 (61 pp.).
Hoerner, S. F., et al., "Fluid-Dynamic Lift," Published by Mrs. Liselotte A. Hoerner, 1985 (482 pp.).
Javelin Advanced Jet Trainer (AJT), Airforce Technology, available at https://www.airforce-technology.com/projects/javelin-ajt/, available at least as early as Dec. 18, 2017, (8 pp.).
McDonnell Dougla F/A-18 Hornet, Wikipedia, available at https://en.wikipedia.org/wiki/McDonnell_Douglas_F/A-18_Hornet, available at least as early as Dec. 18, 2017 (30 pp.).
Poland Developing Grot-2 Airplane With a Motor-Sich Engine, Defense Express, available at https://old.defence-ua.com/index.php/en/news/688-poland-developing-grot-2-airplane-with-a-motor-sich-engine, Mar. 22, 2016 (3 pp.).
Sierra Nevada Corp., TAI Team to Offer Freedom Trainer for T-X, Aviation Week, available at https://aviationweek.com/defense-space/sierra-nevada-corp-tai-team-offer-freedom-trainer-t-x, Dec. 16, 2016 (3 pp.).
Van Dyk, D. J., "Textron Airland's Scorpion: A Smart Gamble," Center for International Maritime Security, available at https://cimsec.org/textron-airlands-scorpion-a-smart-gamble/, Jan. 15, 2016 (8 pp.).
WAFF—World Armed Forces Forum, post by Nutuk, available at https://www.tapatalk.com/groups/worldarmedforcesforum/sierra-nevada-corp-tai-team-to-offer-freedom-train-t231764.html, Dec. 16, 2016 (12 pp.).
U.S. Appl. No. 29/629,919, filed Dec. 18, 2017, Aircraft.
U.S. Appl. No. 16/223,011, 2019/0185127, filed Dec. 17, 2018, Aircraft Design and Technology.
U.S. Appl. No. 17/301,893, filed Apr. 19, 2021, Aircraft Design and Technology.
"International Search Report and Written Opinion of the International Searching Authority," issued in connection with Int'l Appl. No. PCT/US2018/065125, dated May 3, 2019 (11 pages).
"International Preliminary Report on Patentability and Written Opinion of the International Searching Authority," issued in connection with Int'l Appl. No. PCT/US2009/034088, dated Aug. 17, 2010 (5 pages).
"International Search Report and Written Opinion of the International Searching Authority," issued in connection with Int'l Appl. No. PCT/US09/34088, dated Dec. 14, 2009 (7 pages).
"International Search Report and Written Opinion of the International Searching Authority," issued in connection with Int'l Appl. No. PCT/US19/36827, dated Oct. 8, 2019 (11 pages).
"International Search Report and Written Opinion of the International Searching Authority," issued in connection with Int'l Appl. No. PCT/US21/48304, dated Dec. 1, 2021 (10 pages).
Call Systems Technology, Products, "AlarmCall Paging," https://www.call-systems.com/products/alarmcall-paging/, dated Jun. 26, 2018 (available at least as early as Jun. 2017), 3 pages.
Coyote UAS; https://www.raytheon.com/capabilities/products/coyote; one; available prior to May 30, 2016, 1 page.
European Patent Office, "European search report," issued in connection with European Patent Application No. 19822274.7 dated Feb. 23, 2022 (9 pages).
European Patent Office, "Supplementary European search report and Search opinion," issued in connection with European Patent Application No. 18923054.3 dated Feb. 15, 2022 (7 pages).
Hartford, Robin, UAT Puts UAVs on the Radar,www.mitre.org/news/digest/aviation/06 08/av uat.html, Jun. 2008, p. 1-3.
Information Submitted in Parent Patent Applications, see MPEP 609.02 and the section below having the same title.
Military and Commercial Tech, by Hurjet. dated Nov. 23, 2017. found online [May 7, 2019] https://thaimilitaryandasianregion.blogspot.com/2017/11/turkey-chooses-indigenous-jet-engine.html, 2 pages.
Military Aviation, The Mikoyan MIG-29 'Fulcrum-A' (9-12), 2006 https://sirviper.com/index.php?page=fighters/mig-29/mig-29a (Year: 2006), 7 pages.
Schmitt et al., "Perception-Oriented Cooperation for Multiple UAVs in a Perception Management Framework," 2016 IEEE/AIAA 35th Digital Avionics Systems Conference (DASC), pp. 1-10, 2016 (10 pp.).
Strain, Robert, A Lightweight, Low-Cost ADS-B System for UAS Applications, Distribution Unlimited Case 07-0634, 2007, p. 1-9.
Strain, Robert, Lightweight Beacon System for UAS and Other Aviation Applications, Mitre Corporation, 2007, p. 1-9.
Tetron Unveils Scorpion Light Attack, Recce Jet, Aviation Week & Space Technology, http://aviationweek.com/awin/textron-unveils-scorpion-light-attack-recce-jet (Sep. 16, 2013), 4 pages.
Textron Airland's Scorpion: A Smart Gamble, Center for International Maritime Security, http://cimsec.org/textron-airlands-scorpion-a-smart-gamble/20979 (Jan. 15, 2016), 8 pages.
US Department of Transportation Federal Aviation Administration, Pilot's Handbook of Aeronautical Knowledge, 2016, FAA, Chapter 5 p. 5-21-5-42 https://www.faa.gov/sites/faa.gov/files/2022-03/pilot_handbook.pdf (Year: 2016).
World Armed Forces Forum, post by Nutuk. dated Dec. 16, 2016. found online [May 7, 2019] https://www.tapatalk.com/groups/worldarmedforcesforum/sierra-nevada-corp-tai-team-to-offer-freedom-train-t231764.html, 3 pages.
https://www.f-16.net/forum/download/file.php?id=20016&sid=6645f0d30aaa9ddd409e9c55e8058853&mode=view (Year: 1978).

* cited by examiner

AIRCRAFT DESIGN AND TECHNOLOGY

RELATED APPLICATIONS

The application claims the benefit of U.S. Provisional Application No. 62/607,285, filed 18 Dec. 2017, and titled AIRCRAFT DESIGN AND TECHNOLOGY, the disclosure of which is incorporated herein in its entirety by this reference.

TECHNICAL FIELD

The present disclosure relates generally to aircraft design and technology, and more particularly to aircraft design features for high G maneuvering and high angle of attack maneuvers.

BACKGROUND

Typical fighter aircraft is designed to maximize a variety of functional characteristics. For example, a fighter aircraft ideally is able as an aggressor to maneuver behind a target aircraft to fire missiles or guns, and when in the position as a target aircraft to take evasive action as a result. The aggressor relies on visual cues from the target as well as nonvisual cues from radar or targeting systems to anticipate its next position. The aircraft in the defensive position tries to remain as unpredictable as possible to deprive his potential killer of every advantage and to evade air-to-air or surface-to-air missiles. Aircraft attempting to make abrupt maneuvers, for example, suddenly pitching upward or rolling sideways, for example, can subject the pilot to extreme physical conditions and put the aircraft at risk of damage and/or loss of control by the pilot. Other training aircraft are designed to subject a pilot or a pilot with trainer to repeatedly practice and perfect these maneuvers to become proficient at executing them.

Some fighter and trainer aircraft are designed to maneuver by commanding movements on control surfaces that result in loading a normal force on its horizontal stabilizers, vertical tail, ailerons, flaps and other aircraft control-related features. These maneuvering control movements increase aircraft lift and put control surfaces into positions that increase drag. Aircraft in these classes will need extra power to overcome this drag and maintain desired heading, accelerations and attitude. Other aircraft in these categories produce lift during extreme maneuver attitudes with features such as aircraft side of body to wing leading edge extensions that produce both vortex lift and relatively high amounts of drag. These aircraft then require extra propulsive forces to overcome these relatively higher drag levels. Often the engines in these aircraft are larger and capable of producing extra power and propulsive forces. The limits to such maneuvers may be the relative inefficiency of some or all of the aircraft's features. Thus, opportunities exist for aircraft designs that permit optimized maneuvering while considering safety for the pilot and aircraft.

SUMMARY

Aircraft design is in part a balance of performance, functionality, and cost. The aircraft design of the present disclosure balances performance with a compact turbofan engine delivering lower thrust than a typical aircraft in the same class. Thrust is generated by the engines of the aircraft through a propulsion system. By delivering lower thrust while still providing similar maneuverability as is available for other aircraft, the aircraft of the present disclosure can consume less fuel. Lower fuel consumption leads to an overall life-cycle savings in the millions of dollars for operation of the aircraft. The aircraft of the present disclosure is designed to provide sustained G forces in the range of about 6.5 G to about 7.5 G forces with a relatively high steady angle of attack maneuverability (e.g., angle of attack of about 25°) using less thrust. The aircraft can balance thrust and drag to sustain a high turn rate of about 12° to about 13° per second (e.g., at an altitude of about 15,000 feet with 50% of available internal fuel) with dual low thrust engines using novel wing and fuselage design.

One aspect of the present disclosure relates to an aircraft that includes a fuselage, a swept wing oriented laterally relative to the fuselage, at least one horizontal tail surface extending laterally from the fuselage and positioned rearward of the wing, at least one vertical tail surface extending upward from the fuselage, and first and second engines mounted to the fuselage at locations positioned vertically below the fixed wing. The first and second engines are operable to generate relatively low thrust compared to the weight of the aircraft. The aircraft also includes leading edge root extensions mounted to the wing and the fuselage at a leading edge of the wing, a dynamic slat attached to a leading edge of the wing, and a chine formed in the fuselage along lateral sides thereof at a nose of the aircraft, the chine terminating forward of the fixed wing. In other embodiments, the aircraft may include a single engine, and the same or similar features related to the output of the engine in combination with other features of the aircraft may be possible.

The wing may extend through the fuselage. The wing may be a single-piece, fixed wing. The first and second engines may be housed in the fuselage. Inlet portions to the engines may be housed in nacelles, and/or the nacelles may define inlet portions of the engines. Each engine may include an inlet duct, and/or the inlet ducts may lead to inlets of the engines. The inlet duct may be positioned rearward of the leading edge of the wing. The wing may have a leading edge sweep angle of less than 45° relative to a direction normal or perpendicular to a length dimension of the fuselage. In some embodiments, the wing has a leading edge sweep angle in the range of about 25° to about 35° relative to a direction perpendicular or normal to the length dimension of the fuselage (e.g., a lateral dimension of the aircraft).

The first and second engines may be operable to generate maximum sustainable thrust in the range of about 3,200 lbf to about 4,000 lbf each. The aircraft may have an empty weight in the range of about 9,000 lbs. to about 10,000 lbs. The aircraft may have a maximum loaded weight in the range of about 12,000 lbs. to about 14,000 lbs. The wing may be tapered from the fuselage toward the tips of the wing. The leading edge root extensions may have a planform area to wing planform area ratio in the range of about 0.1% to about 5%. The leading edge root extensions may have an ogive shape. The aircraft may have a thrust to weight ratio in the range of about 0.5 to about 1.0, and more particularly in the range of about 0.5 to about 0.8.

Another aspect of the present application relates to a method of operating an aircraft. The method may include providing an aircraft having a fuselage, a swept wing extending laterally relative to the fuselage, at least one horizontal tail surface extending laterally from the fuselage, at least one vertical tail surface extending upward from the fuselage, a dynamic slat attached to a leading edge of the wing, and first and second turbine engines. The first and second engines may be mounted internal the fuselage. Inlets to the engines may be located at positions vertically below the wing. The engines may be arranged adjacent to tail feature control surfaces and/or horizontal and vertical stabilizers of the aircraft. The aircraft may have a maximum take-off weight, and the turbine engines provide a maximum continuous thrust. The method further includes operating the aircraft with a maximum continuous thrust to maximum take-off weight ratio in the range of 0.5 to 0.6, sustained turns in the range of about 6.5 G to about 7.5 G, and angle of attack of about 25°. Additionally or alternatively, the method may include adjusting dynamic slats that enable maneuvering of the aircraft, wherein the adjusting is based on a schedule that is a function of speed and angle of attack.

The method may also include providing leading edge root extensions mounted to the fixed wing and the fuselage at a leading edge of the fixed wing, the leading edge root extensions having a planform area ratio relative to a planform area of the fixed wing in the range of about 0.1% to about 5%, the leading-edge root extensions creating lifting vortex flow at angles of attack of about 25°. The method may include providing the aircraft with a nose chine formed in the fuselage along lateral sides thereof at the nose of the aircraft, the nose chine terminating forward of the fixed wing, the nose chine configured to shed air vortices at high angles of attack above stall to reduce spin susceptibility.

A further aspect of the present disclosure relates to an aircraft that includes a fuselage, a wing structure that extends continuously through the fuselage, first and second engines mounted to the fuselage, leading edge root extensions mounted to the fixed wing and the fuselage at a leading edge of the wing structure, and at least one dynamic slat mounted to a leading edge of the wing structure, the at least one dynamic slat being movable between a retracted position and at least one extended position (based at least in part on a scheduled airspeed and/or angle of attack) to facilitate angle of attack for the aircraft of at least 25°.

The wing structure may include first and second wing sections connected to a center wing box. The aircraft may further include at least one horizontal tail surface extending laterally from the fuselage and positioned rearward of the wing structure, and at least one vertical tail surface extending upward from the fuselage. The aircraft may include a chine formed in the fuselage along lateral sides thereof at a nose of the aircraft, the chine terminating forward of the wing structure. The at least one extended position may include an orientation of a slat chord at an angle of 8° and about 13° relative to a wing chord of the wing structure. The first and second engines may be housed in an aft fuselage and each engine is fed by an inlet duct, the inlet ducts being positioned rearward of the leading edge of the fixed wing. The wing may have a leading edge sweep angle of less than 45° relative to a line arranged normal to length dimension of the fuselage. In some embodiments, the wing structure may have a leading edge sweep angle in the range of about 25° to about 35° relative to a line normal to the length dimension of the fuselage and in the horizontal plane through the center of the front and aft spars in the wing box. The first and second engines may be operable to generate maximum sustainable thrust in the range of about 3600 lbf to about 4,000 lbf each. The aircraft may have an empty weight in the range of about 9,000 lbs. to about 10,000 lbs., and a maximum loaded weight in the range of about 12,000 lbs. to about 14,000 lbs. The wing structure may be tapered from the fuselage toward tips of the fixed wing. The at least one extended position may include an orientation of a slat chord at an angle of 8° and about 17° relative to a wing chord of the wing structure. The aircraft may have a thrust to weight ratio in the range of about 0.5 to about 1.0, and more particularly in the range of about 0.5 to about 0.8.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
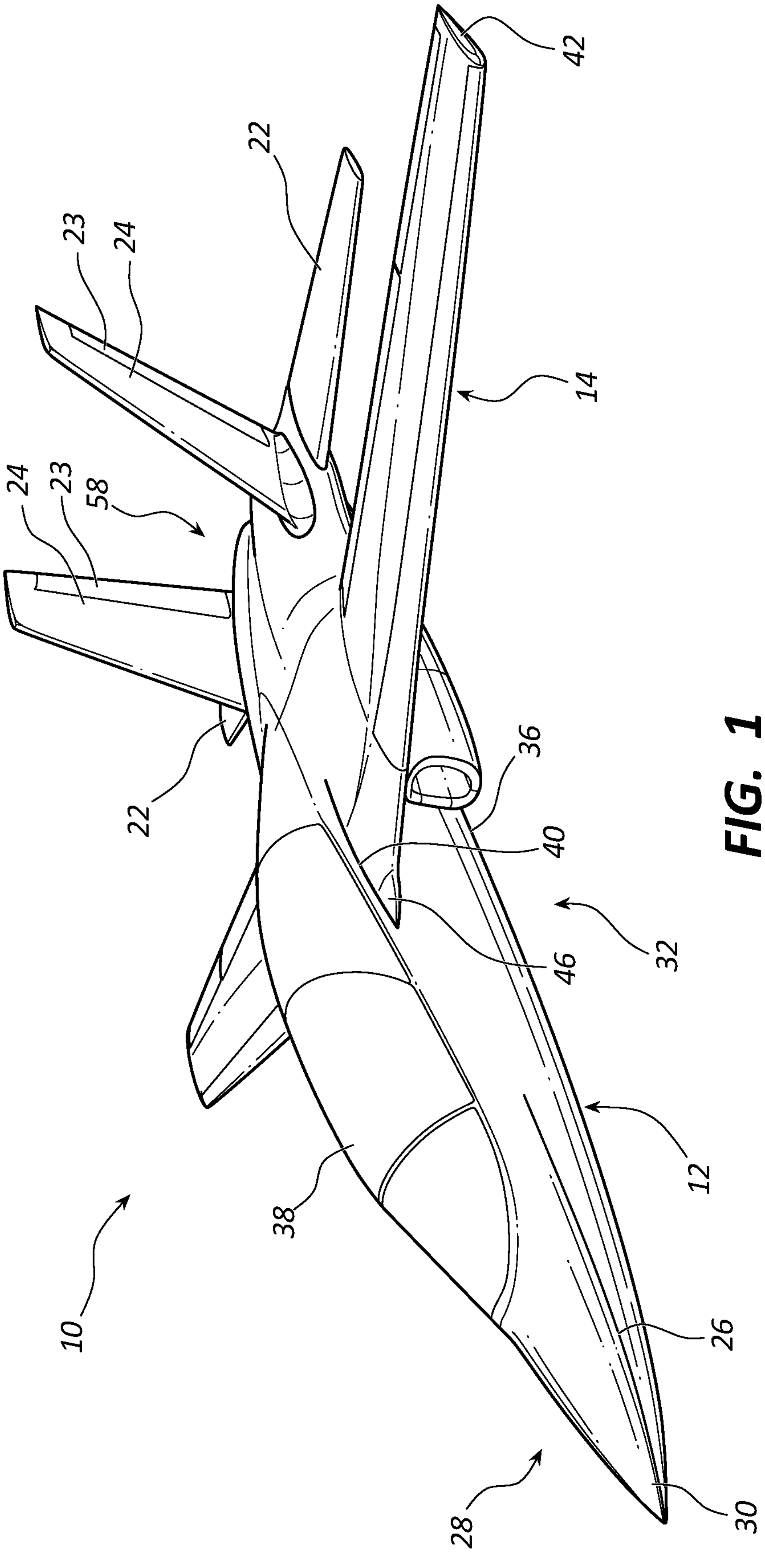
FIG. 1 is a top perspective view of an aircraft according to one embodiment.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Multiple high-performance aircraft have high maneuverability with sustainable gravitational forces. These aircraft are typically a jet-propelled, fixed-wing trainer aircraft, fighter aircraft, or attack aircraft. These types of aircraft may perform acrobatic maneuvers at subsonic or transonic flight regimes. The aircraft may utilize a variety of different combinations of wing planforms, positions, and engine thrust to weight levels. The engine thrust to weight level ratios may vary from 0.5 to greater than 1. An engine for a given aircraft typically is considered low thrust if the thrust to weight ratio is less than 1. Using an engine or pair of engines that results in a thrust to weight ratio for the aircraft in the range of about 0.5 to about 1.0 would be considered a low thrust engine(s) or a relatively low thrust engine(s) for this type of aircraft.

Every aircraft produces an amount of drag. The aircraft may balance the amount of drag with the amount of thrust produced by the engine(s) plus any reserve thrust available for acceleration and/or climb. Engine thrust is the amount of force that moves the aircraft through the air. The aircraft also have various engine inlet geometries. Some aircraft, such as the Boeing/Saab T-X aircraft, utilize a single engine configuration with bifurcated ducts that split to a single engine face. Other aircraft have dual engine configuration, each with a respective right and left duct feeding separate engines. Low-powered trainer aircraft and low-powered attack aircraft and low-powered fighter aircraft need to generate a low enough amount of drag to enable the aircraft to perform advanced acrobatic maneuvers, including high angles of attack.

In one embodiment, the aircraft of the present disclosure may include a mechanical arrangement of various aircraft elements to achieve an optimized state of maximum lift at minimal drag. The aircraft may result in high performance capabilities while having a combination of low engine thrust, low-drag at the wing to fuselage interface, and undistorted air flow to the engine fans. The aircraft may maneuver at high turning rates with limited availability of thrust by minimizing drag proportionate to the available lift and/or thrust. The aircraft may also perform flight maneuvers at a high angle of attack without the use of high levels of vortex lift. An example of flight maneuvers may include a sustained turn rate of about 12° to about 13° per second turns and relatively high angles of attack. The aircraft may sustain high angles of attack of at least 25°. The aircraft may have a high gravitational sustained turn rate of about 6.5 G to about 7.5 G. The aircraft may execute flight maneuvers while maintaining a relatively low distortion source of air through the engine inlets. Reducing the amount of distortion at the engine inlets enables the dual engine design of the aircraft to maintain peak performance parameters without generating high cycle transients at the fan face that may reduce engine life.

FIG. 1 is a top perspective view of an aircraft 10. The aircraft 10 has a fuselage 12, wings 14, horizontal stabilizers 22 (also referred to as horizontal tail surfaces), and vertical stabilizers 24 (also referred to as vertical tail surfaces). The horizontal stabilizers 22 may be or include moveable control surfaces. The vertical stabilizers 24 may contain moveable control surfaces or rudders 23. In some embodiments there is only a single fixed vertical stabilizer. In other embodiments, there are two. In still other embodiments, the horizontal and vertical stabilizers are combined into a single moveable control surface or stabilator, which may project from the fuselage at some angle between horizontal and vertical. In some embodiments, this angle may be between about 35° and 50°. The aircraft 10 also has a chine 26 on a forward end 28 of the aircraft 10, extending from a nose 30 of the aircraft towards a center 32 of the underbody 36. A canopy 38 covers the cockpit (not shown). In some embodiments, the cockpit may consist of a single area. In other embodiments, the cockpit may seat multiple personnel.

The fuselage 12 may be shorter than an overall length of the aircraft 10. For example, the horizontal stabilizer 22 may extend, in an aft direction, beyond the fuselage 12 increasing the overall length of the aircraft 10. In a trainer embodiment of the aircraft 10, the aircraft may have a dry weight of about 9,000 lbs. to about 10,000 lbs. In some embodiments, the aircraft 10 may have a dry weight of about 9,600 lbs. In some embodiments, the aircraft 10 may have a maximum takeoff weight of about 12,000 lbs. to about 14,000 lbs. In some embodiments, the aircraft 10 may have a maximum takeoff weight of about 13,250 lbs. Fighter or other embodiments of the aircraft 10 may have lower or higher weights.

Figure 12:
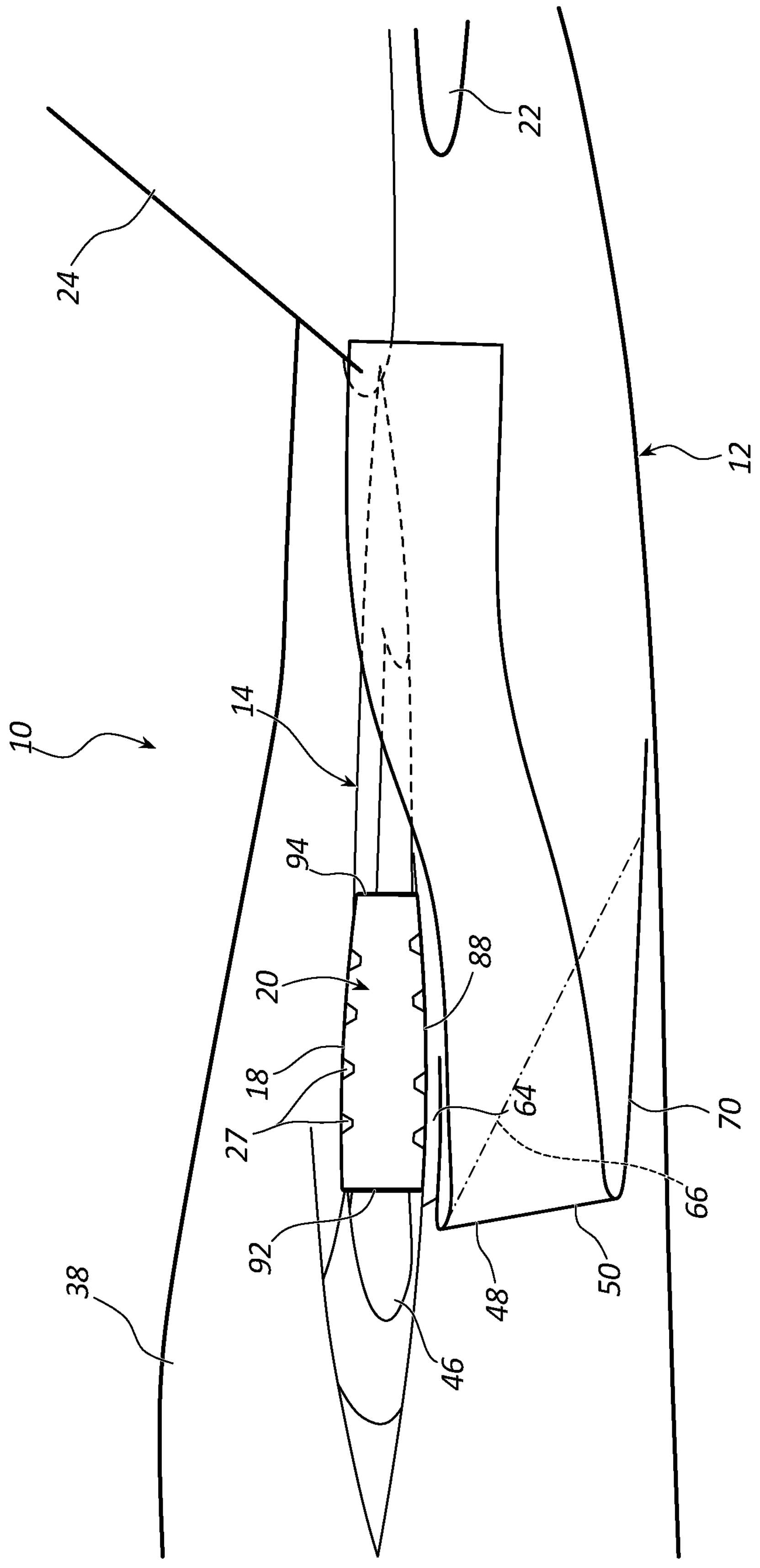
FIG. 12 is a partial left-side cross-sectional view of the aircraft shown in FIG. 10 taken along cross-section indicators 12-12 showing external inlet lip and nacelle and internal inlet and wing box features of the aircraft.
Figure 13:
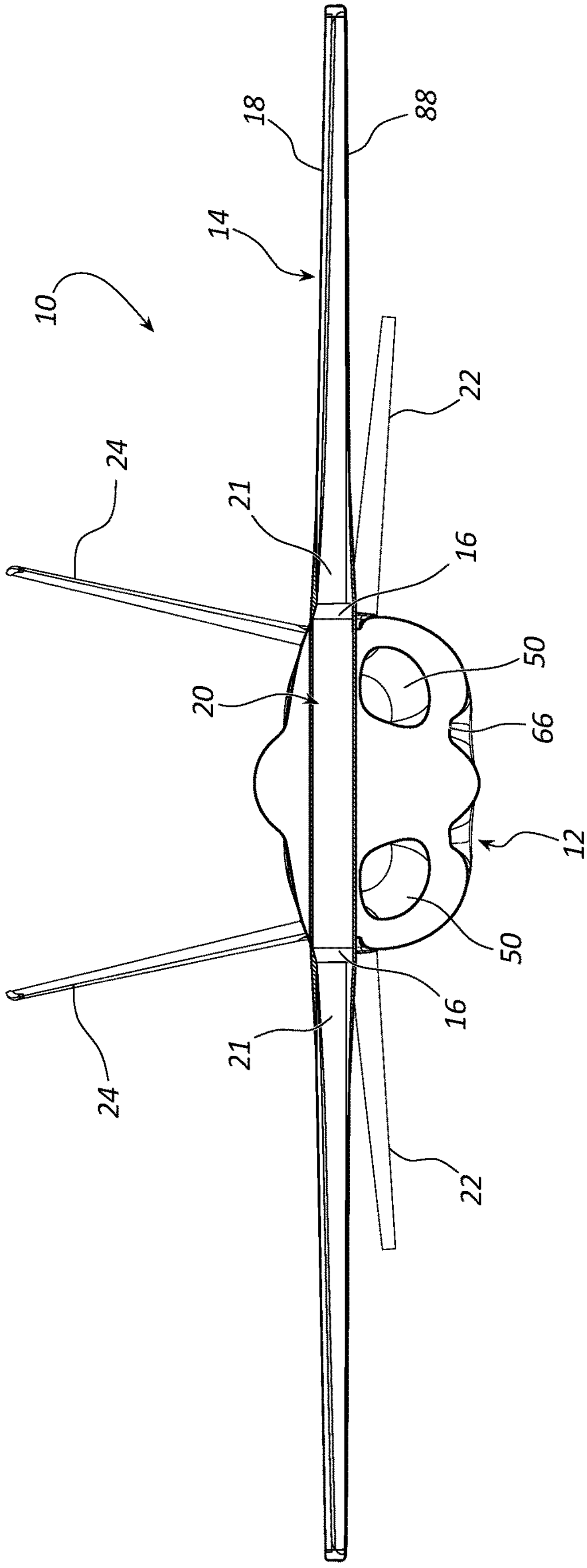
FIG. 13 is a partial cross-sectional forward-looking-aft view of the aircraft shown in FIG. 8 (taken along cross-section indicators 13-13 in FIG. 14) illustrating an internal one-piece wing structure and looking at the aft wing attachment bulkhead.
Figure 14:
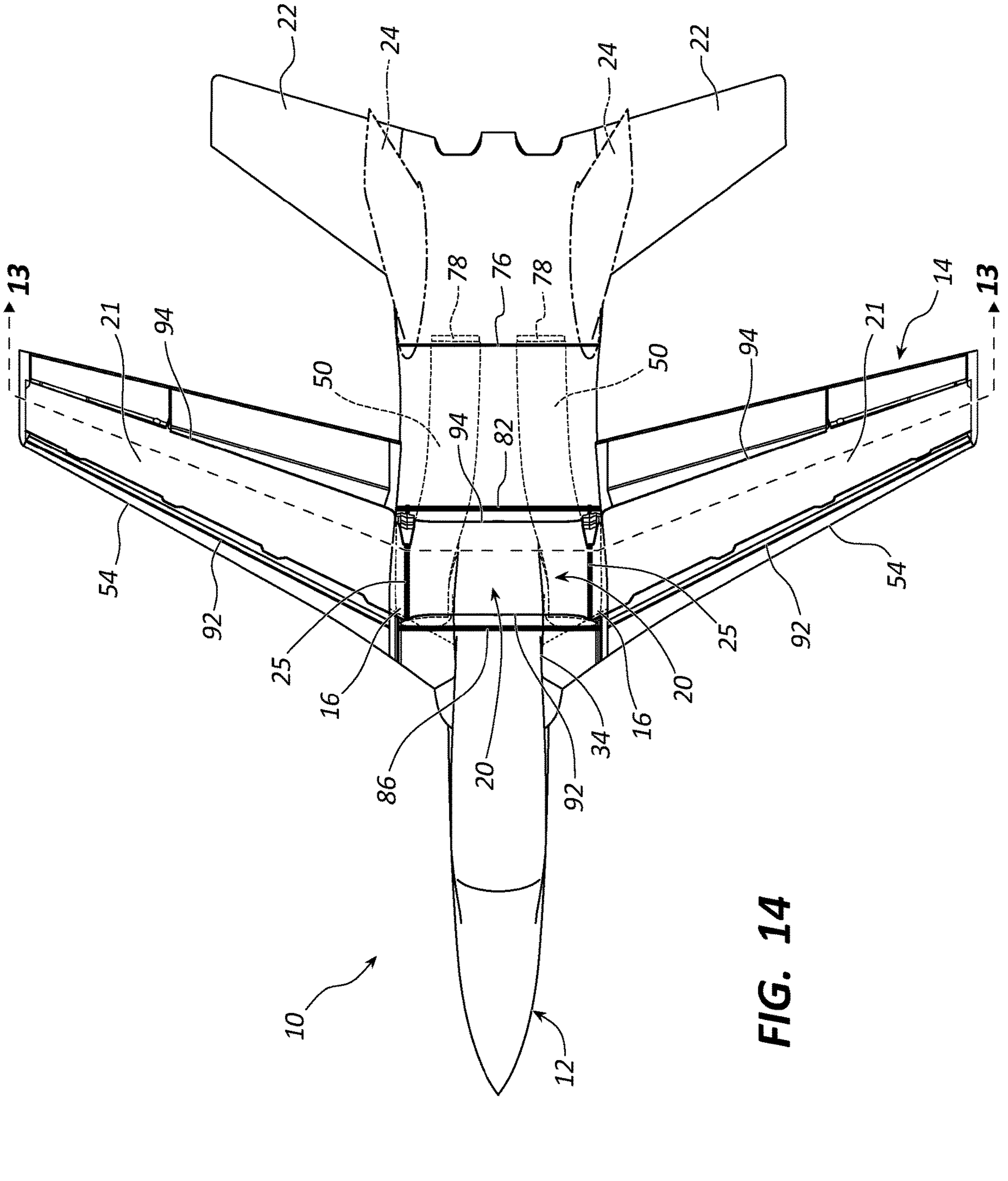
FIG. 14 is a top view of the aircraft shown in FIG. 13 with over wing fairing removed illustrating the one-piece wing structure and supporting bulkheads, with inlets passing under wing and through bulkheads.

In some embodiments, the aircraft 10 has a continuous one-piece wing 14 that passes through the fuselage as shown the FIGS. 13 and 14. FIG. 14 shows the aft spar 94 and bulkhead 82 of the aircraft 10. In this embodiment, the wing 14 is attached to the fuselage 12 through the wing support 16 at a forward wing attach bulkhead 86, shown in FIG. 14. As outboard wing boxes 21 (also referred to as side wing boxes) of the wing 14 deflect upward in a pull up maneuver, for example, a center wing box 20, also shown in FIG. 14, is free to deflect downward relative to other portions of the fuselage 12. The center wing box 20 includes a forward wing spar 92 and a rear wing spar 94. A kick rib 25 may be arranged on opposite left and right sides of the center wing box 20. A plurality of wing hat stiffeners 27 may be mounted to the center wing box 20 for increased strength and/or stiffening of the center wing box 20 and wing 14 generally (see FIG. 12).

In alternative embodiment of aircraft 10, the wings 14 may be tapered and may additionally be swept. In some embodiments, the wings 14 may also be cranked. A cranked wing has a variable leading edge sweep angle along the span of the wing. The wings 14 may be located at about 55% to about 75% of the fuselage height (measured from a bottom side of the fuselage to a top side thereof) and about 50% to about 55% of the fuselage length (measured from a front end of the fuselage to a rear end thereof).

The wing 14 may have a wing planform, a shape and layout of the overall wing 14. The overall planform may have an area of about 200 to 300 square feet. In some embodiments, the planform may have an area of about 220 square feet to about 260 square feet. The wing planform has an intermediate shoulder height wing planform with a high aspect ratio. An aspect ratio is defined as a measurement of the span of the wing squared divided by an area of the wing planform. A higher aspect ratio wing has a lower drag and a slightly higher lift than a lower aspect ratio wing. The high aspect ratio of the wing combined with an intermediate shoulder height wing planform generates lift at low speeds needed to maneuver. The span to chord (aspect) ratio for example aircraft in accordance with the present disclosure may be at least 4. In some embodiments, the aspect ratio is between about 5 and about 6. In other embodiments, the aspect ratio may be between about 5.4 to about 5.8. Aspect ratios of greater than 4 (e.g., in the range of about 5 to about 6) may be considered a relatively high aspect ratio for this type of aircraft.

The wings 14 may also have a taper ratio. Tapering refers to the change in wing width from the root 40 of the wing 14 to the tip 42 of the wing 14. The taper ratio is a ratio of the tip chord to root chord. The tip chord is typically measured as the width of the tip 42, and the root chord is a width of the wing measured at the root 40. In the wing 14 as shown, the taper ratio varies near the wing support 44 to reduce skin thickness and increase overall wing section inertia. In some scenarios, the root 40 is measured as the width of the wing near the area of the kick rib 25 shown in FIG. 14.

The high efficiency of the wing 14 may enable the use of lower thrust engines and while the aircraft 10 performs high G maneuvers necessary to train pilots and offensive/defensive maneuvers. Other comparable aircraft have straight tapered, tapered and swept planforms, or delta planforms. Carefully tailored wing airfoils, planform, twist, leading and trailing edge devices provide high maximum lift coefficient out to transonic Mach numbers, with relatively low induced drag for transonic high-G maneuvering at relatively low thrust levels.

Figure 16:
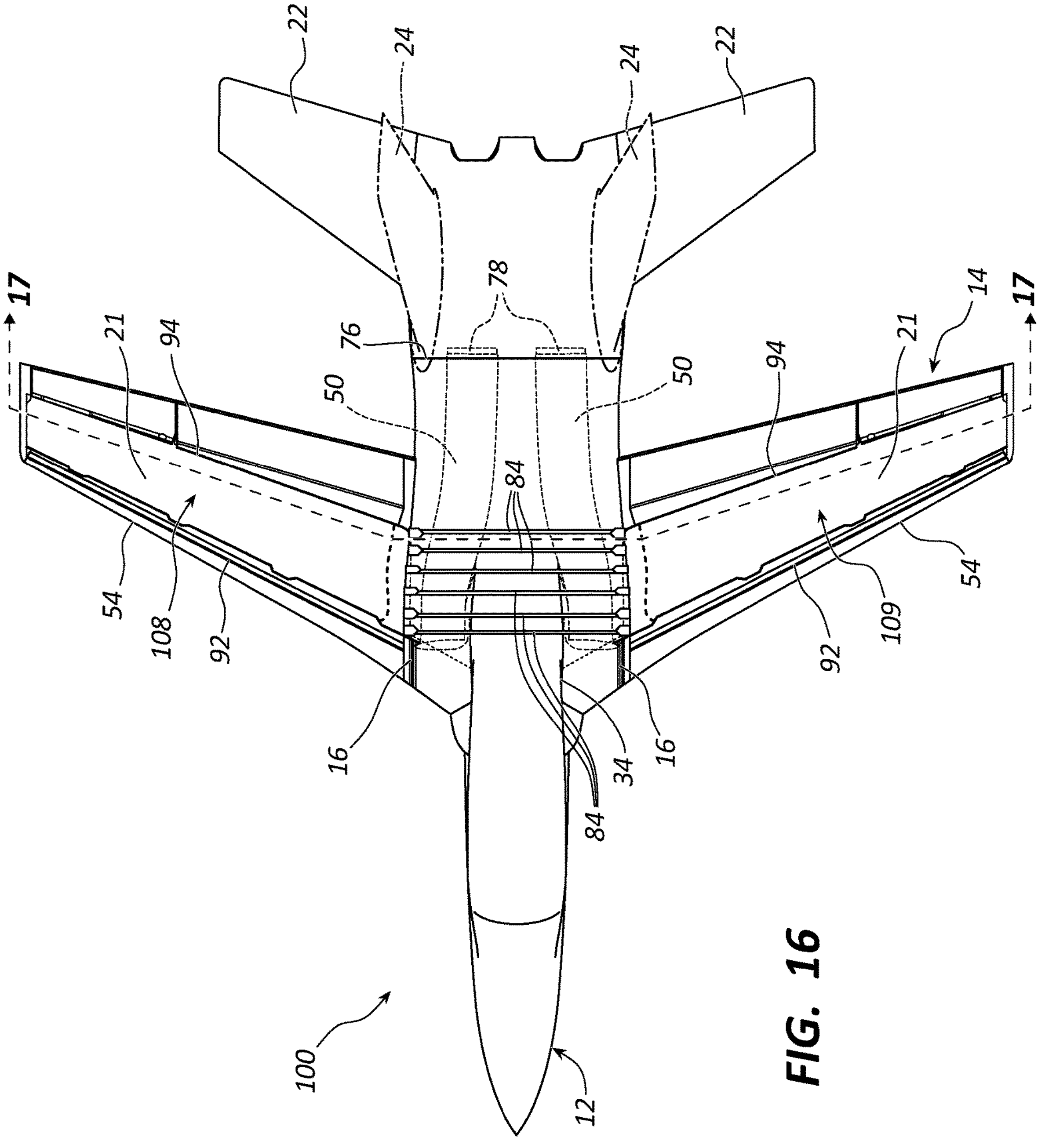
FIG. 16 is a top view of the aircraft shown in FIG. 1 illustrating an alternative wing structure with right and left wing portions connected to multiple bulkheads within the fuselage.
Figure 17:
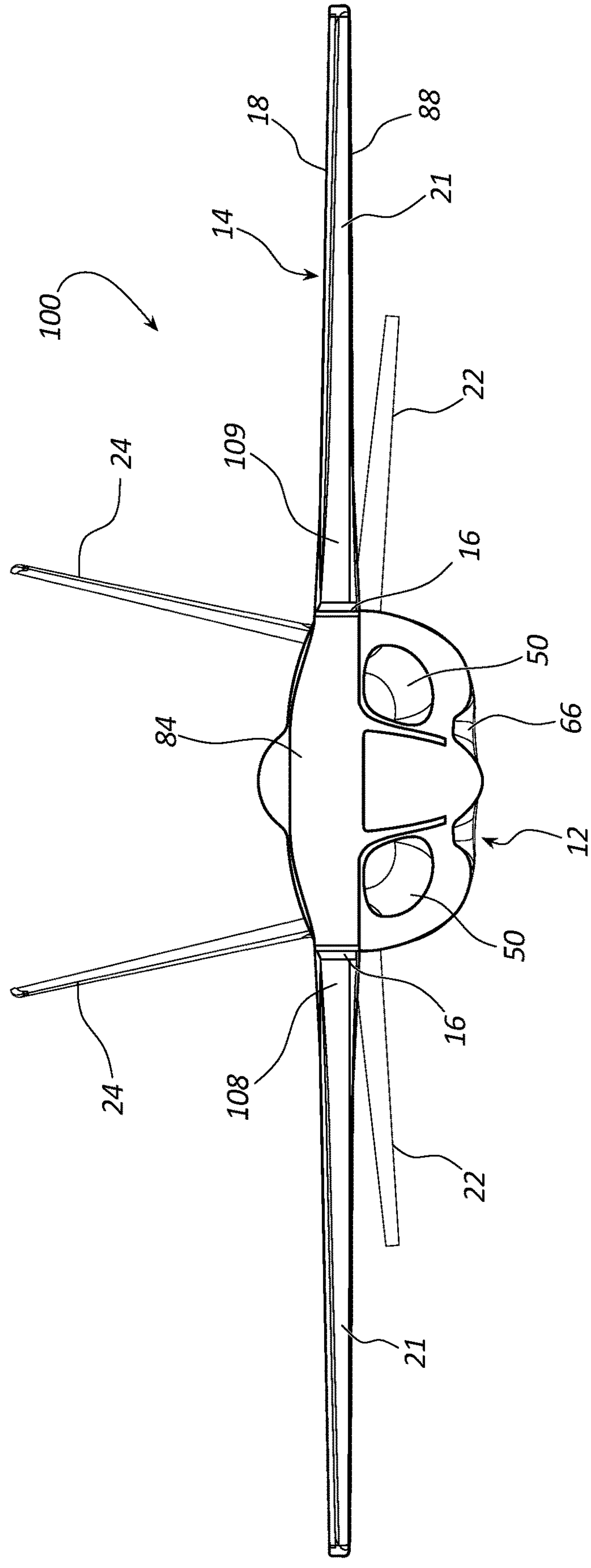
FIG. 17 is a schematic cross-sectional view of the aircraft shown in FIG. 16 taken along cross-section indicators 17-17 illustrating the forward wing attach bulkhead structure.
Figure 18:
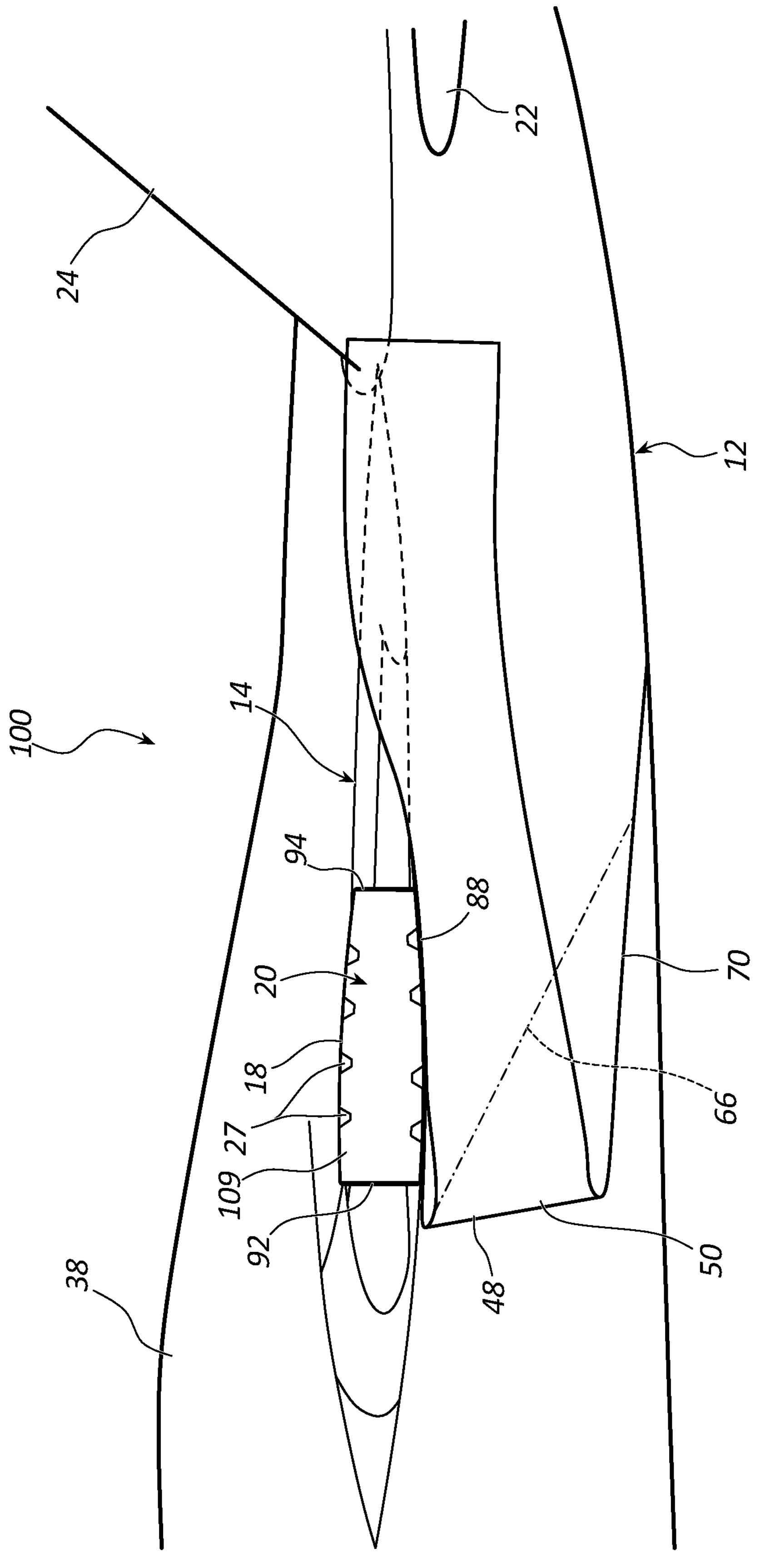
FIG. 18 is a partial left-side cross-sectional view of another example aircraft in accordance with the present disclosure illustrating the internal inlet passing across an extended surface of the lower wing skins.

In an alternate embodiment shown in FIGS. 16-18, separate wings or wing sections 108, 109 are spliced into a plurality of wing support bulkheads 84 in the fuselage 12. The wing support bulkheads 84 are located between a projection of the forward wing spar 92 and a rear wing spar 94 of the outboard wing boxes 21 of wing 14, as shown in FIG. 16. The loading in the wing skins is concentrated at these frame support points and is spliced through joints at each frame upper and lower location. The inlet duct 50 can be fully integrated and supported by these wing support bulkheads and the inlet duct 50 can be reshaped and straightened to take out at least some of the bend in the embodiment shown in FIG. 12 needed to avoid an interference with the aft wing spar. The distortion in the air flow in the inlet duct 50, if more straightened (e.g., as shown in FIG. 18 compared to FIG. 12), can therefore be minimized.

Figure 2:
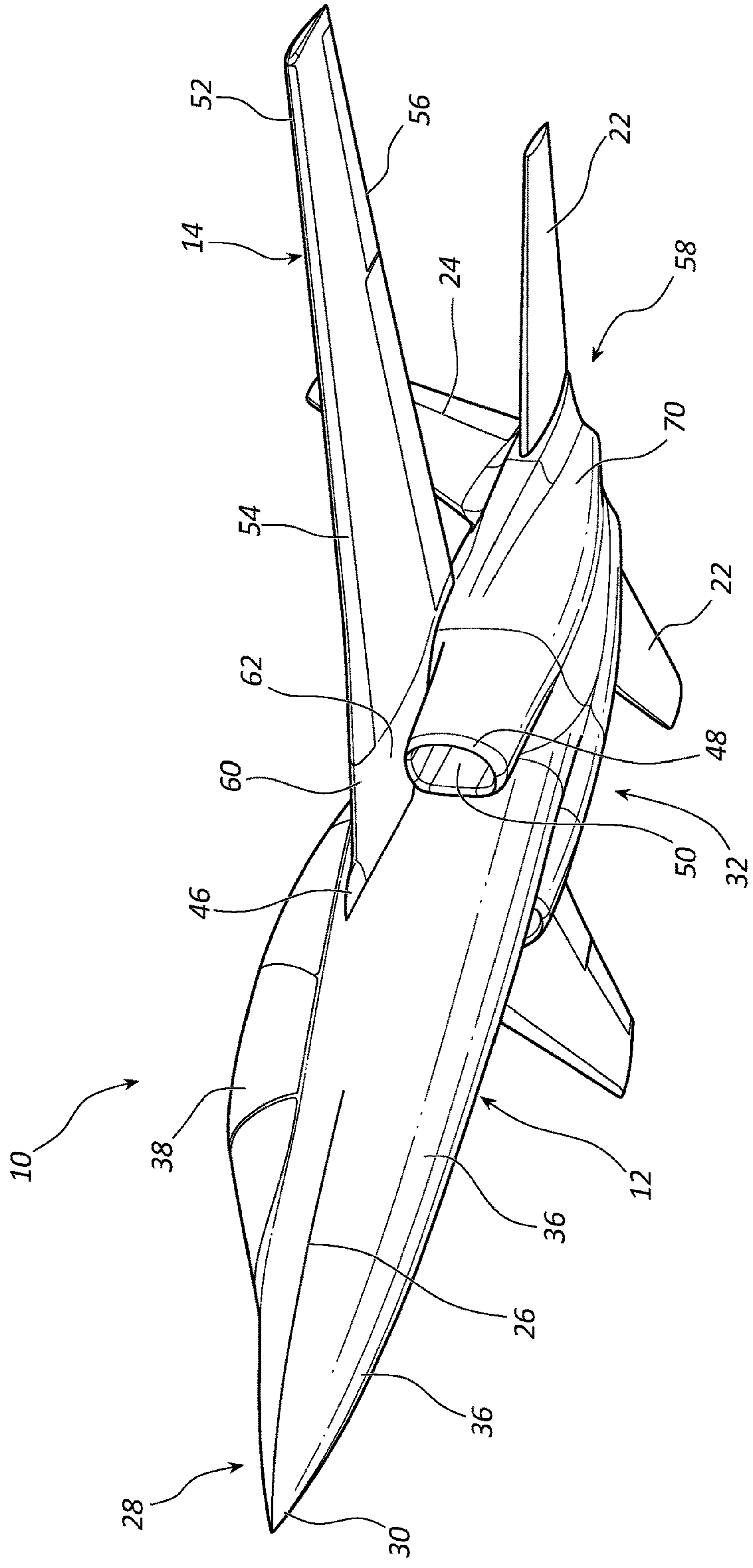
FIG. 2 is a bottom perspective view of the aircraft shown in FIG. 1.
Figure 8:
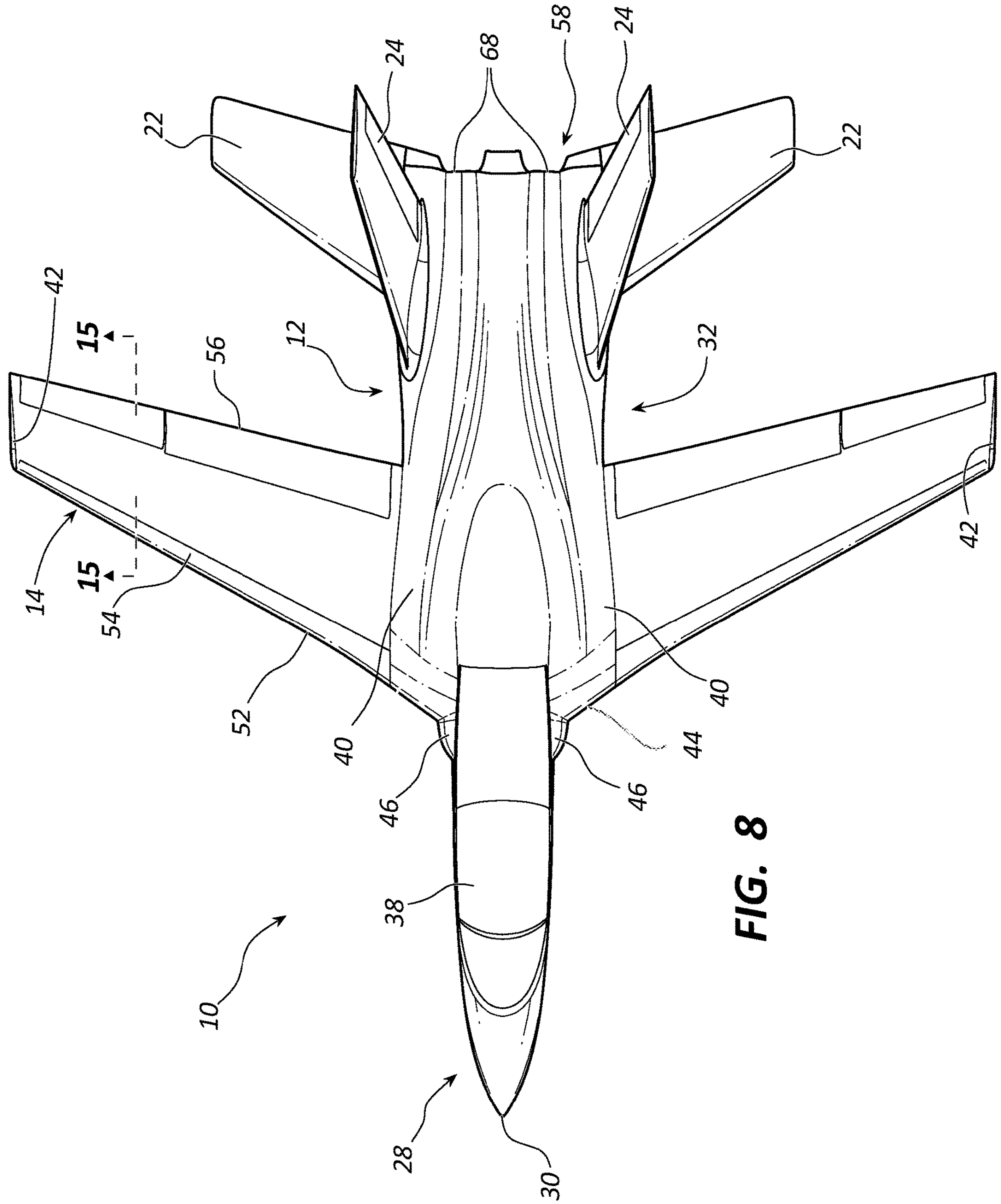
FIG. 8 is a top view of the aircraft shown in FIG. 1.

Referring to FIGS. 2 and 8, the wing 14 may have a fixed leading edge extension (LEX) 46 at a root of the wing 14. In some embodiments, the LEX 46 may comprise a circular segment or an ogive to a circular segment. In alternative embodiments, the LEX 46 may have a rectangular or triangular segment. The LEX 46 may be fixed on the inlet lips 48 of the engine intake, or inlet duct 50. In another embodiment, the LEX 46 may attach to the wing 14. A span of the LEX 46 is about one quarter to three quarters the width of the inlet duct 50. In some embodiments, the span of the LEX 46 is half the width of the inlet duct 50. The span of the LEX 46 may also extend forward about 10% to about 30% of the wing chord. In some embodiments, the span of the LEX 46 may be about 20% of the wing chord. In some embodiments, the LEX may have an area of about 0.1% to about 5% of the wing planform. The LEX 46 may create a vortex in the air at high angles of attack.

The wing 14 also has a leading edge slat 54 that interfaces with the fixed leading edge portion 60. The leading edge slat 54 is different from a leading edge flap for at least the reason that when the leading edge slat 54 is extended to a particular angled orientation relative to the fixed leading edge portion 60 (e.g., at an angle of about 9°, a slot or gap is exposed between the leading edge slat 54 and a fixed portion of the wing (e.g., fixed leading edge 90 shown in FIG. 15). The leading edge slat 54 may be a relatively large dynamic slat. The leading edge slat 54 may be scheduled as a function of Mach number and angle of attack. In some embodiments, the leading edge slat 54 may extend both forward and down. For example, the leading edge slat 54 may extend forward, away from an aft end 58 of the aircraft 10. As the leading edge slat 54 extends forward, it may also extend downward toward the underbody 36 of the aircraft 10. This orientation of the leading edge slat 54 may maintain an optimize lift at various angles of attack.

Figure 15:
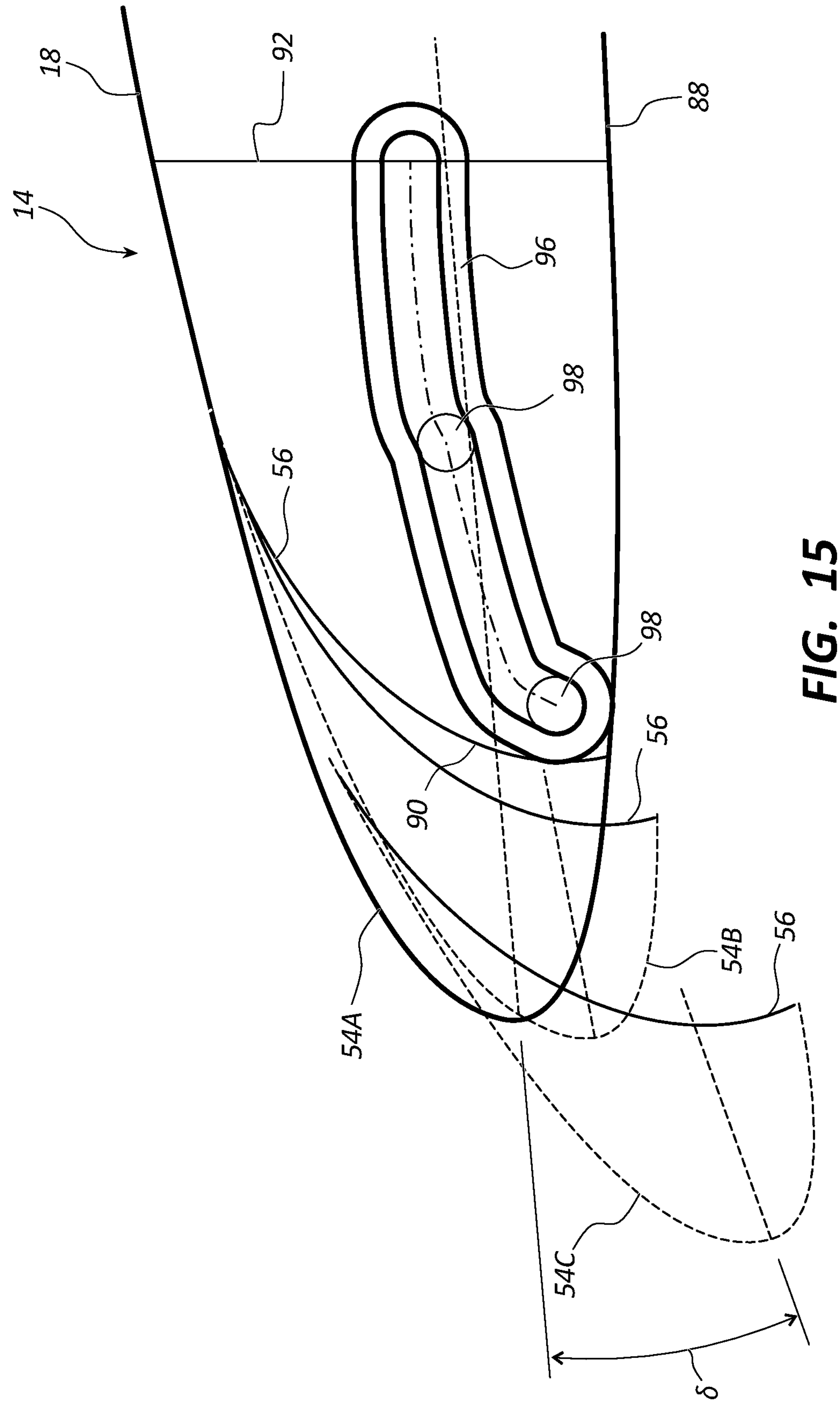
FIG. 15 is a partial side cross-sectional view of a wing of the aircraft shown in FIG. 1 with a leading edge slat in multiple operational positions.

FIG. 15 is a cross-sectional view showing a forward portion of the outer wing box 21 and positions for the leading edge slat 54 in retracted, semi-deployed and fully deployed positions. The fixed leading edge 90 (see also FIG. 10) is mounted to the forward side of the forward wing spar 92 in the wing box. The leading edge slat 54 deploys in multiple phases. In the first phase (shown in solid lines in FIG. 15) a seal is maintained between the upper wing skin 18 and the trailing edge 56 of the leading edge slat 54*a*. In the second phase (shown in broken lines in FIG. 15) the leading edge slat 54*b* extends away from the fixed leading edge 90 of the wing 14. In the third phase (also shown in broken lines in FIG. 15) the leading edge slat 54*c* extends even further down and away from the fixed leading edge 90 of the wing 14. The amount of leading edge extension is measured as a comparison between the angle of the wing chord and the slat chord, shown as angle δ in FIG. 15. The wing chord may be defined as a line extending from a forward most point on the wing cross section to aft most point. In some embodiments, the leading edge slat 54 fully extends between about 8° and about 17°. In other embodiments, the leading edge slat 54 extends between about 11° and about 15°. In still other embodiments, the leading edge slat 54 extends between about 13° and about 14°. In some embodiments the leading edge slat 54 remains sealed against the leading edge 90 between the angles of about 2° and about 7°, in other embodiments between about 3° and about 6°, and in still other embodiments between about 4° and about 5°.

The leading edge slat 54 may move relative to the fixed leading edge 90 and wing box 20 along a controlled path defined by a track 96. In one embodiment, the track 96 is carried by the leading edge slat 54 and one or more followers 98 carried by the fixed leading edge 90 may move along a length of the track 96 to predetermined positions that define the first, second and third positions 54*a-c* shown in FIG. 15.

Figure 19:
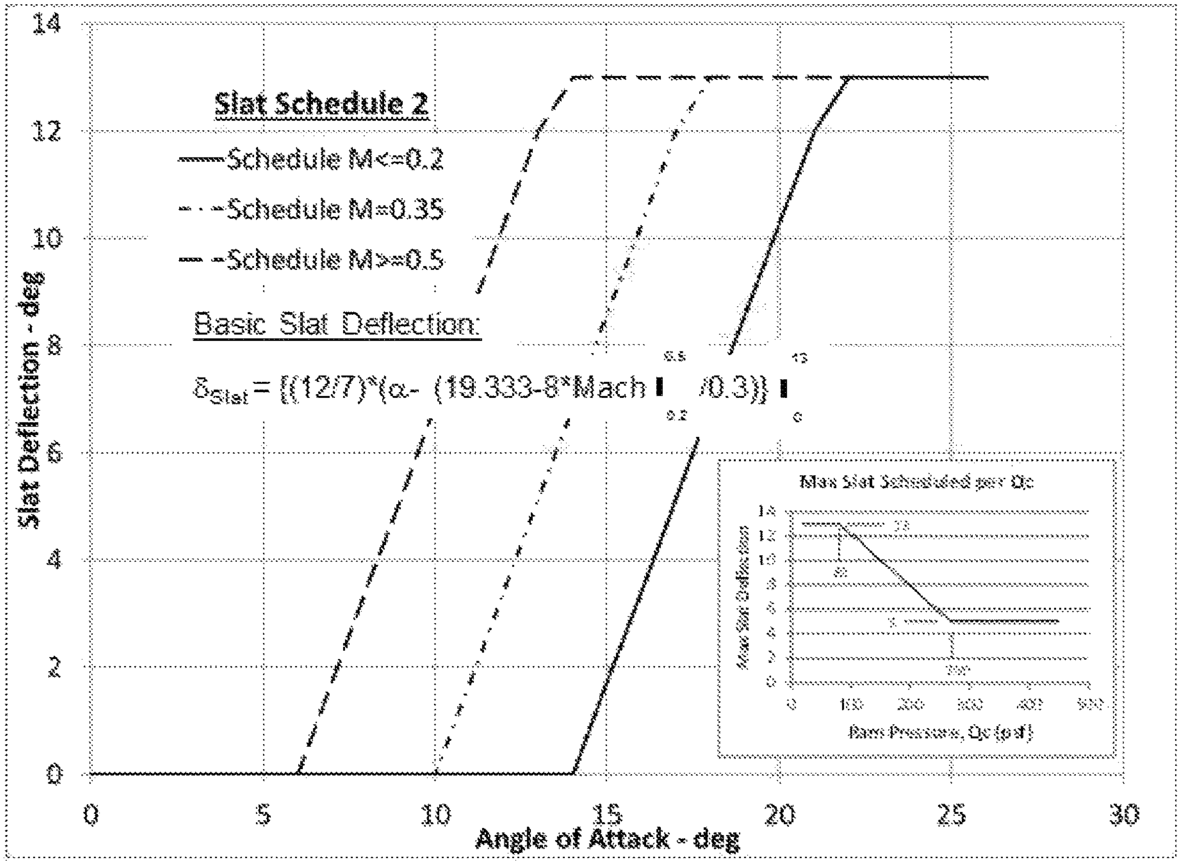
FIG. 19 is a graph showing equations and schedules for positions of a leading edge slat relative to angle of attach and Mach number.

Table I shows equations and schedules for positions of leading edge slat 54 relative to angle of attach and Mach number. Table I below and FIG. 19 show information related to a dynamic slat scheduling, which relates to airplane high angle of attack maneuvering capability. Other traditional slats may be deployed to increase drag and change airfoil shape for higher lift at slower speeds. The information provided in Table I and FIG. 19 substantiate a major differentiator in how the aircraft embodiments disclosed herein reduce drag at high angle of attack by scheduling the slat to deploy dynamically as a function of angle of attack and airspeed.

TABLE I

| Slat Position Schedule $\delta_{Slat} = \{(12/7) * (\alpha - (19.333 - 8 * \text{Mach}/0.3)\}$ (Slat deflection is limited to 0° to 13°) | |
|---|---|
| Qc (psf) | Slat Upper Limit (deg) |
| 82 | 13 |
| 269 | 5 |

The inlet duct 50 is shown in the bottom perspective view of FIG. 2. The inlet duct 50 may be arranged rearward of a leading edge 52 of the wing 14. The inlet duct 50 may be routed against a lower portion 62 of the wing 14. The inlet duct 50 may be positioned to minimize flow distortions entering the inlet duct 50. Flow distortions are distortions in air flow that can create turbulent air. The presence of a large amount of turbulent air may affect engine efficiency and functionality. Positioning the inlet duct 50 directly against the lower portion 62 of the wing 14 may minimize distortions entering the engine. In another embodiment, the inlet lip 48 may be positioned near the leading edge of the wing 14. The position of a lip of the inlet duct 50 may influence a length of the duct 50, such as decreasing the length of the duct 50. Decreasing the length of the duct may lower the overall weight of the aircraft 10 and increases duct efficiency. Decreasing weight typically also decreases the cost of operating the engine as less fuel may be required to power the craft. The proximity of the inlet duct 50 to the wing 14 may also improve air flow into the duct 50 at high angles of attack. Improving air flow improves the overall performance of the engine and therefore the performance of the aircraft.

Figure 10:
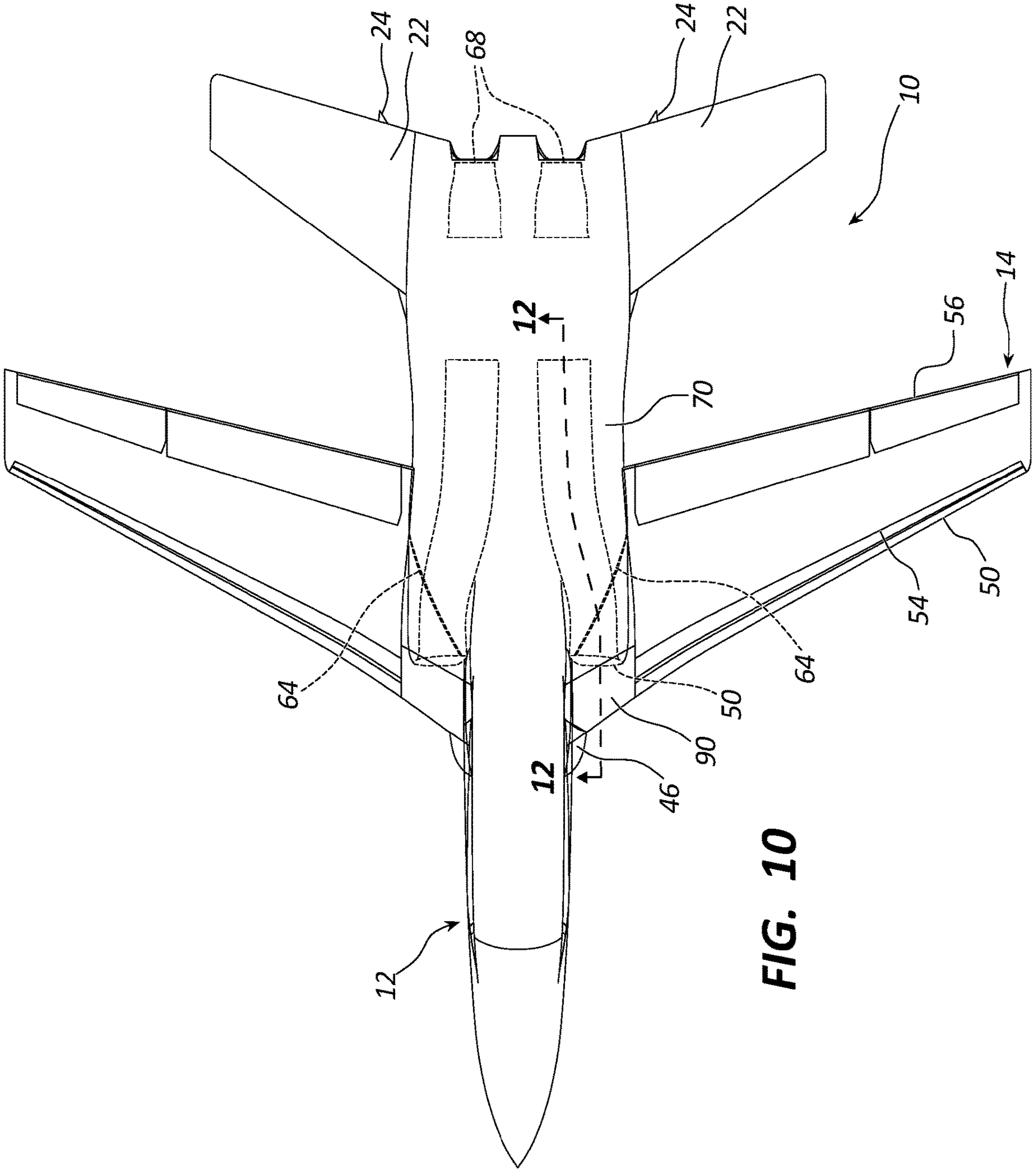
FIG. 10 is a top view of the aircraft of FIG. 1 illustrating internal nacelle, diverter, inlet and exhaust features of the aircraft.

The inlet duct 50 may have one or more diverters. Inlet diverters may move boundary air outboard and away from the inlet duct 50. For example, as shown in FIG. 10, an upper inlet diverter 64 may be adjacent to a top side of the inlet duct 50. The upper inlet diverter 64 may be a horizontal diverter. The upper inlet diverter 64 may be at least 2.5 inches away from the wing 14. The diverter may fill the gap between the wing and the inlet nacelle. In some embodiments, the aircraft 10 may additionally include a vertical inlet diverter 66 (see FIG. 18). The vertical inlet diverter 66 may channel low energy boundary air away from the engine inlet duct 50. The vertical inlet diverter 66 combined with the upper inlet diverter 64 (also referred to as a horizontal inlet diverter) may minimize drag on the aircraft while diverting boundary air away from the inlet duct 50. In some embodiments, the vertical inlet diverter 66 may be about 1 inch to about 4 inches away from the fuselage 12, and in one example about 2.5 inches away from the fuselage 12. Likewise, the horizontal diverter may not be used at all, in which case the inlet lip is blended into the wing leading edge and lower wing skin, and in other embodiments spaced about 1 inch to about 4 inches away as described similarly to the vertical diverter.

Technically, the nacelles 70 are used when the inlet duct 50 is cantilevered forward of the diverters, both vertical and horizontal. Once the inlet duct 50 passes aft of these diverters, the inlet duct 50 is inside what would be considered fuselage 12.

Figure 3:
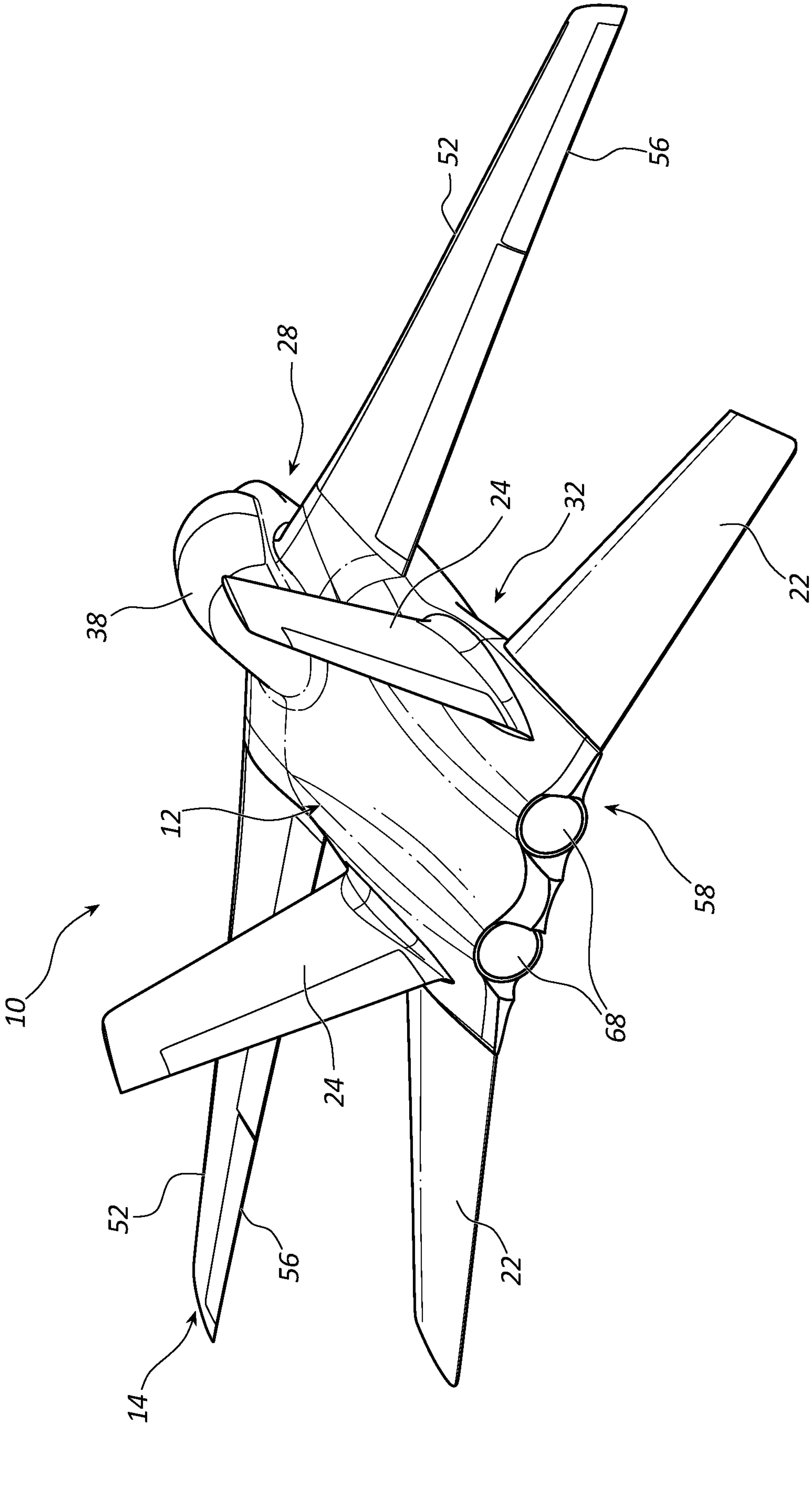
FIG. 3 is an aft-looking-forward, top perspective view of the aircraft shown in FIG. 1.

FIG. 3 is an aft-looking-forward perspective view of the aircraft 10. An engine exhaust 68 may be located adjacent to the aft end 58 of the aircraft. Each engine may have a respective engine exhaust 68.

Figure 4:
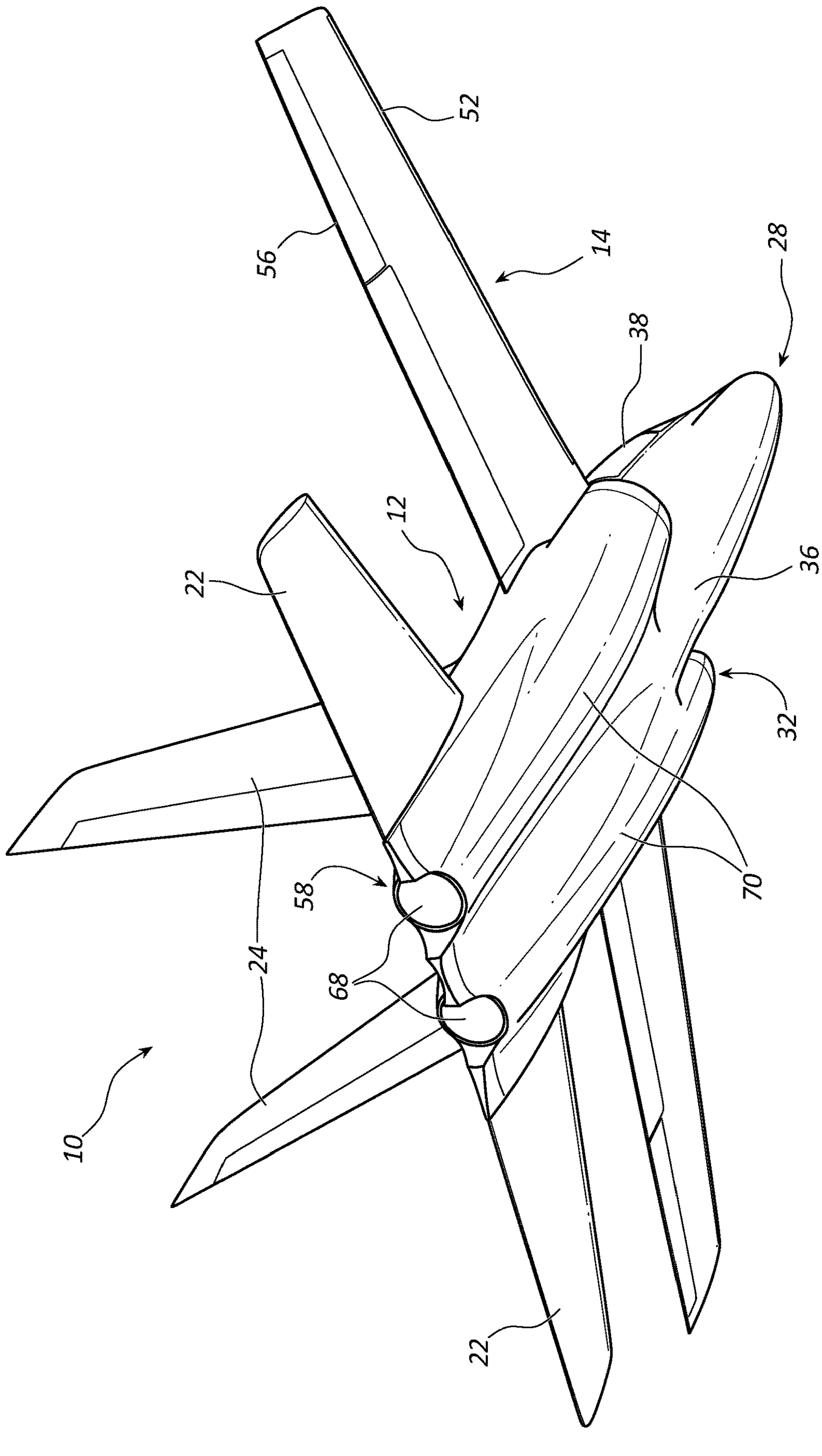
FIG. 4 is an aft-looking-forward, bottom perspective view of the aircraft shown in FIG. 1.

The engines may be internal to the fuselage as shown in the perspective view of FIG. 4. The engines may comprise a small, two-spool turbofan engine. Each engine may provide a thrust of about 3,200 lbf to about 4,000 lbf. In some embodiments, the engine thrust may be about 3,600 lbf, which may equate to about 16,000 N. The engine may be about 60 inches to about 80 inches long. The fan diameter may be between about 20 inches and about 30 inches. A single engine operable to produce between about 6,400 and 8,000 lbf of thrust could be used in place of a pair of the engines having the specifications described above.

The aircraft 10 may have two engines, each with a respective inlet duct 50. In another embodiment, the aircraft 10 may have a single engine with a bifurcated duct. A bifurcated duct may include a portion along its length that is split into separate ducts to provide separate flows of air into the engine from different locations. Each engine may generate between about 3,200 lbf and about 4,000 lbf., and in some embodiments about 3,300 lbf to about 3,900 lbf. The engine may have a dry weight of about 600 lbs. to about 700 lbs., and in one embodiment be about 650 lbs. This type of engine may provide a thrust to empty weight ratio of about 0.70 to about 0.76. An example engine is a Williams FJ44-4M two-spool, turbofan engine produced by Williams International/Rolls-Royce.

Figure 7:
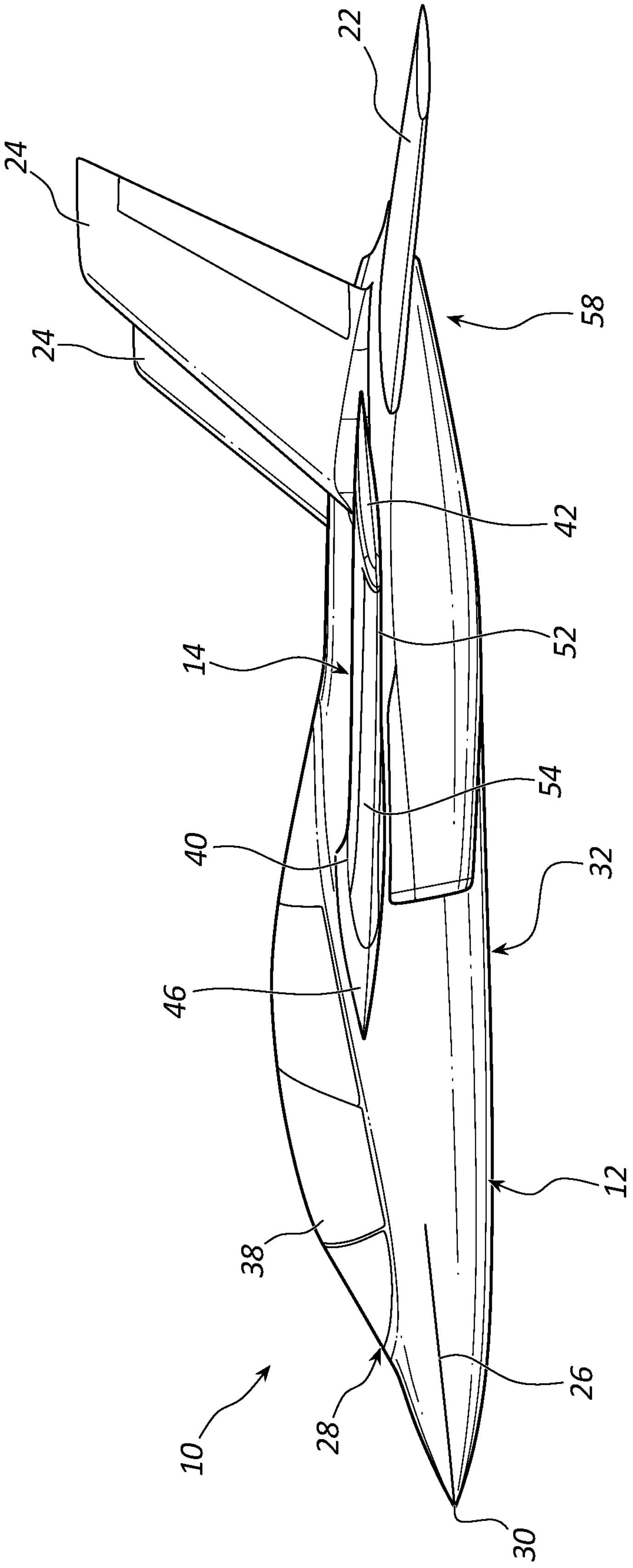
FIG. 7 is a left-side view of the aircraft shown in FIG. 1.

An outline of the chine 26 can be seen in FIG. 7. The chine 26 may include a change in the forward cross-section of the nose 30 of the aircraft 10. The chine 26 may have a variable arc. A maximum arc length of the chine 26 may be arranged at an angle of about 15° to about 35°. In some embodiments, the chine 26 may blend into the fuselage 12 of the aircraft as the chine 26 reaches a predetermined distance from the tip of the nose 30. In some embodiments, the chine 26 may terminate forward of the wing 14. The predetermined distance may be measured as a percentage of the overall length of the aircraft 10. For example, the chine 26 may have an overall length of about 15% to about 30% of the fuselage length. In some embodiments, the chine 26 to inlet highlight centroid may be about 25% to about 40% of fuselage length. The highlight centroid may be the center of the inlet lip.

Figure 11:
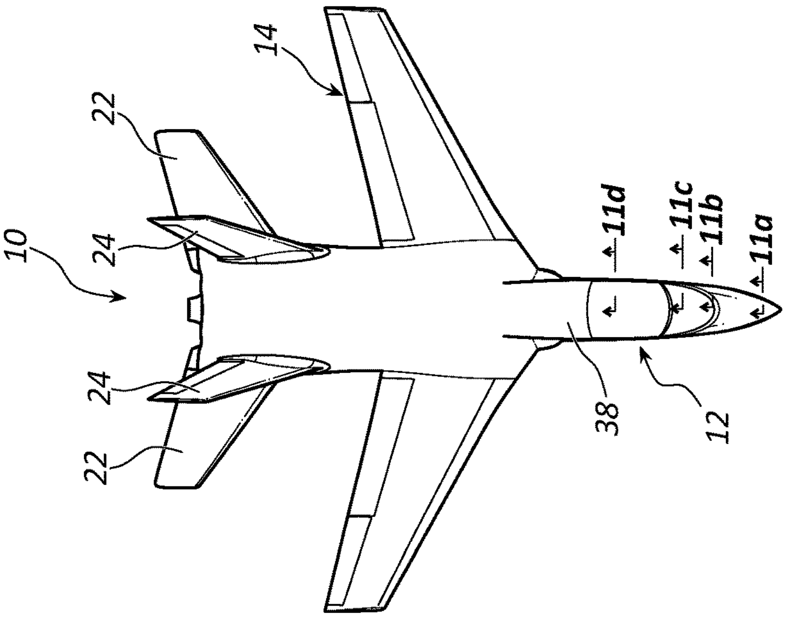
FIG. 11 is a top view of the aircraft of FIG. 1 with cross-section indicators.
Figure 11A:
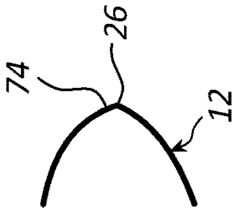
FIGS. 11*a*-11*d* are partial cross-sectional views of the aircraft shown in FIG. 11 illustrating chine features of the aircraft.
Figure 11B:
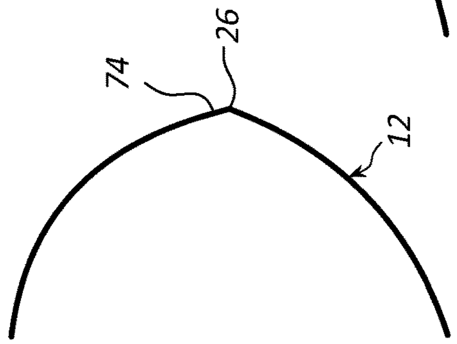
Figure 11C:
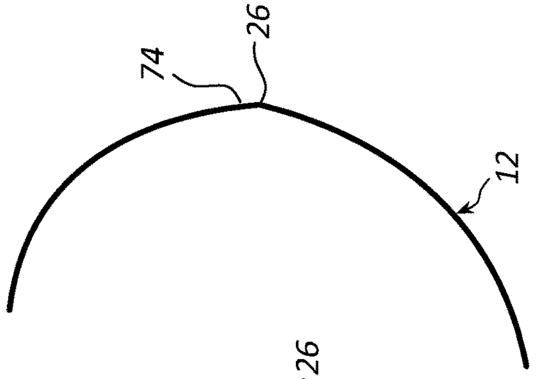
Figure 11D:
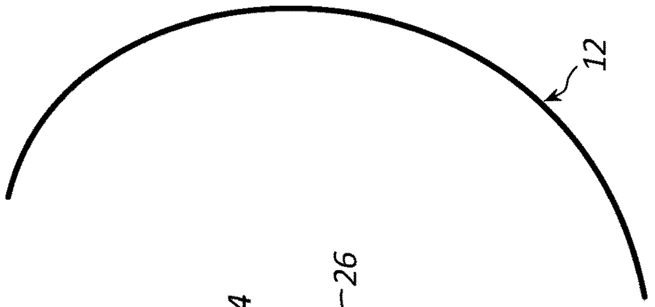

The chine 26 extends from the forward tip of the nose 30 along a maximum half breadth of the forward fuselage and toward the LEX 46. In some embodiments, the chine 26 may extend all the way to and blend into the LEX 46. In other embodiments, the chine 26 may form a sharp angular break 74 as shown in FIG. 11*a*-11*c* in the forward portion. The chine 26 may transition to a blend out in the aft portion as shown in FIG. 11*d* where there is no distinguishable change in contour along the maximum half breath.

In some embodiments, the blend may occur between about 35% and about 80% of the distance between the tip of nose 30 to the LEX 46. In other embodiments, the sharp angular break 74 may cause the air flow to predictably separate from the skin surface during high angle of attack maneuvers at this consistent location on the skin surface.

The angular break 74 shown in FIGS. 11*a*-11*c* may help prevent a vortex from separating at a random location along the fuselage 12 and at random times and locations, which vortex may cause an oscillation of forces on the nose surface to occur back and forth on the right side and/or the left side of the aircraft 10 and impart a random yaw force on the aircraft 10. In other embodiments, the aerodynamic lift associated with vortex shedding may be beneficial to achieving a high angle of attack position in flight. In still other embodiments, the additional drag associated with vortex shedding may be limited by blending out the chine 26 at an intermediate position between the tip of the nose 30 and the LEX 46. In some embodiments, the blend may occur between about 40% and 60% of the distance between the tip of the nose 30 to the LEX 46. In other embodiments, the blend may occur at about 50% of the distance.

The chine 26 may enhance stability of the aircraft 10 at high angles of attack. If the aircraft 10 did not have a chine 26, the aircraft may become difficult to control in yaw during certain maneuvers, such as at high angle of attack.

In some embodiments, the nose 30 may extend along about 10% of the fuselage length in front of the forward end 72 of the canopy 38. The nose 30 may be extended further to cover any additional equipment or aircraft systems such as the ballast provision or radar located inside the surface of the nose 30. In other embodiments, the nose may extend up to about 20% of the fuselage length in front of the forward end 72 of the canopy 38.

In some embodiments, a cross-section of the canopy 38 may enable higher pilot visibility. For example, a forward end 72 of the canopy 38 may curve downwards near the nose 30 of the aircraft 10. This cross-sectional configuration may allow a pilot greater visibility below (or above) the aircraft 10 depending on aircraft 10 orientation.

Figure 9:
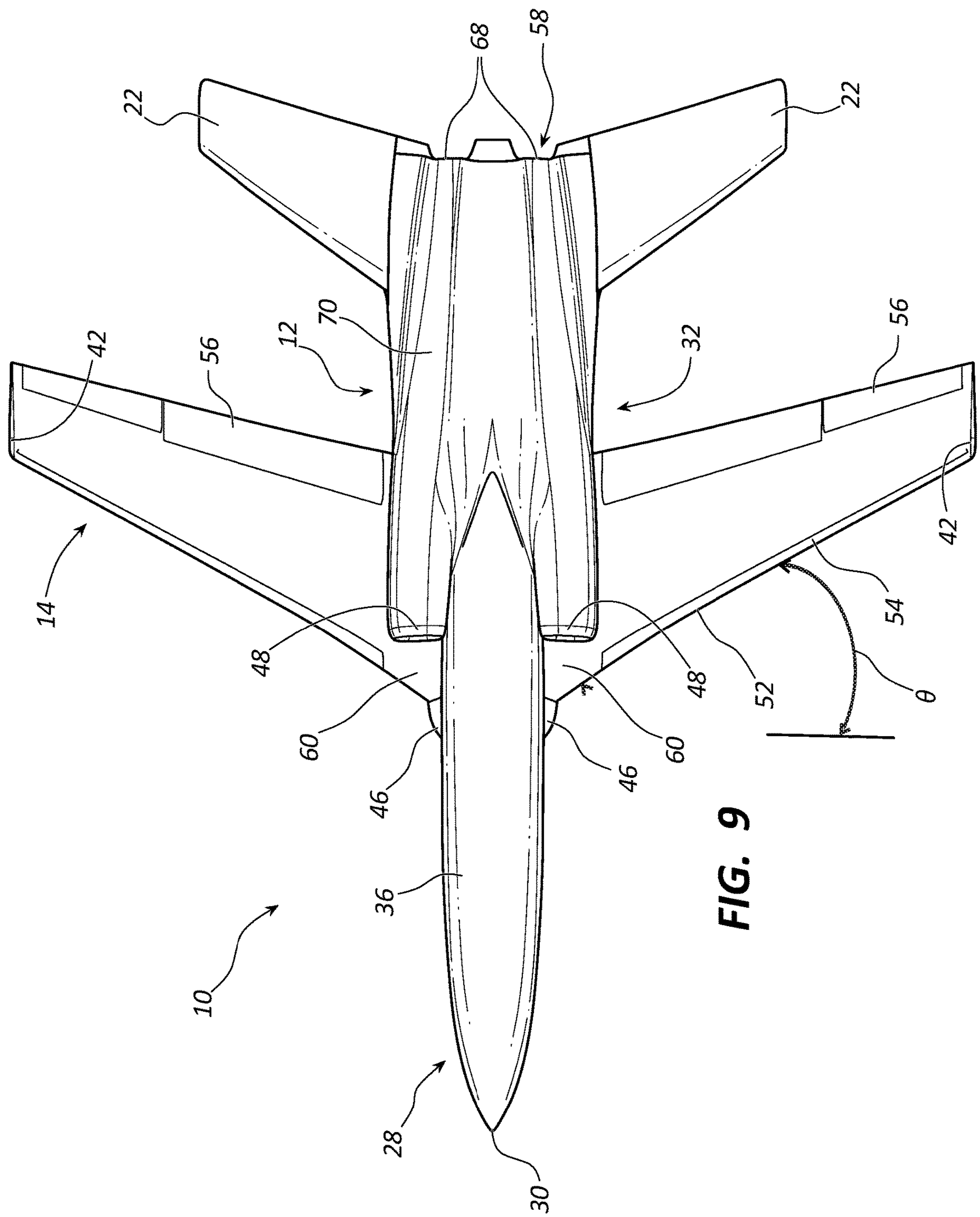
FIG. 9 is a bottom view of the aircraft shown in FIG. 1.

FIG. 8 is a top down view of the aircraft 10. FIG. 9 is a bottom up view of the aircraft 10. A leading edge sweep angle θ of the wing 14 may be seen in FIG. 9. The planform of the wing 14 may be more easily viewed in these views.

Figure 5:
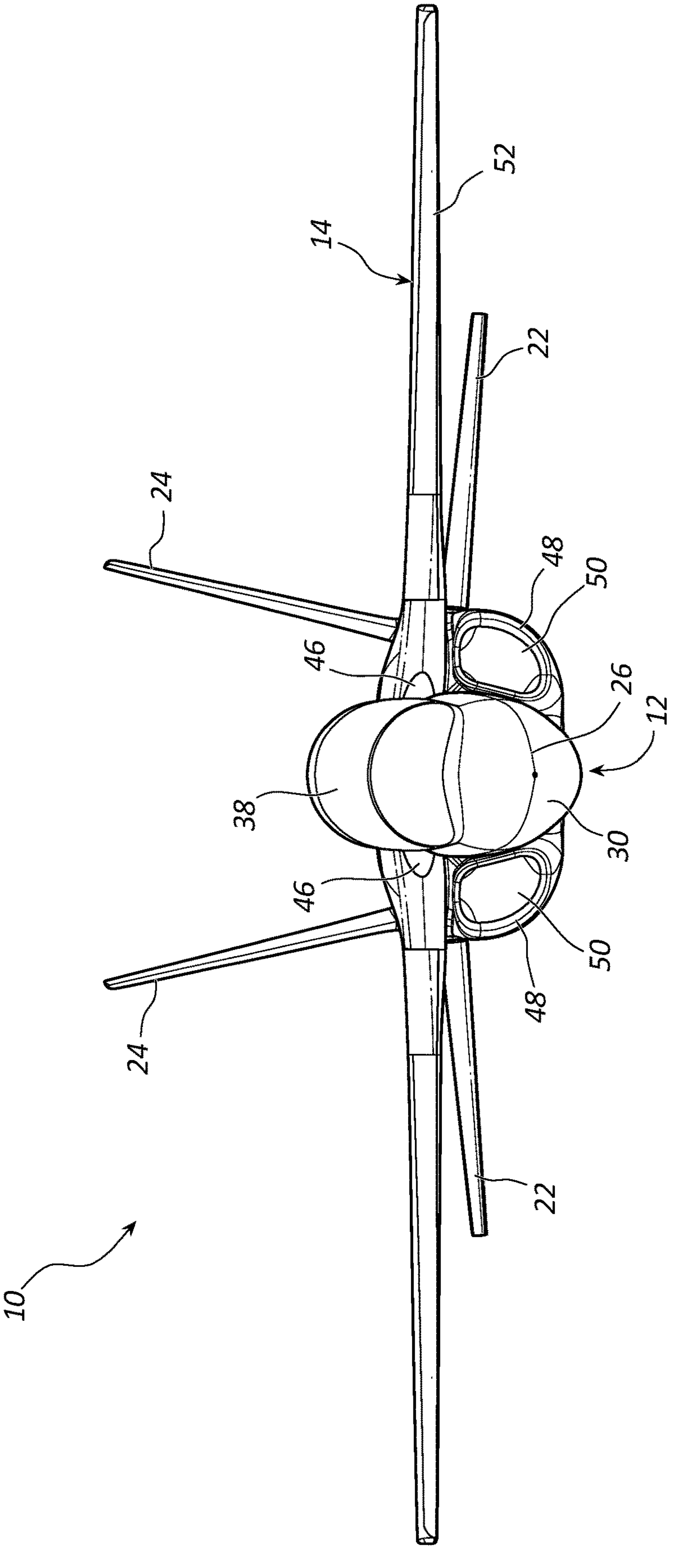
FIG. 5 is a forward-looking-aft view of the aircraft shown in FIG. 1.
Figure 6:
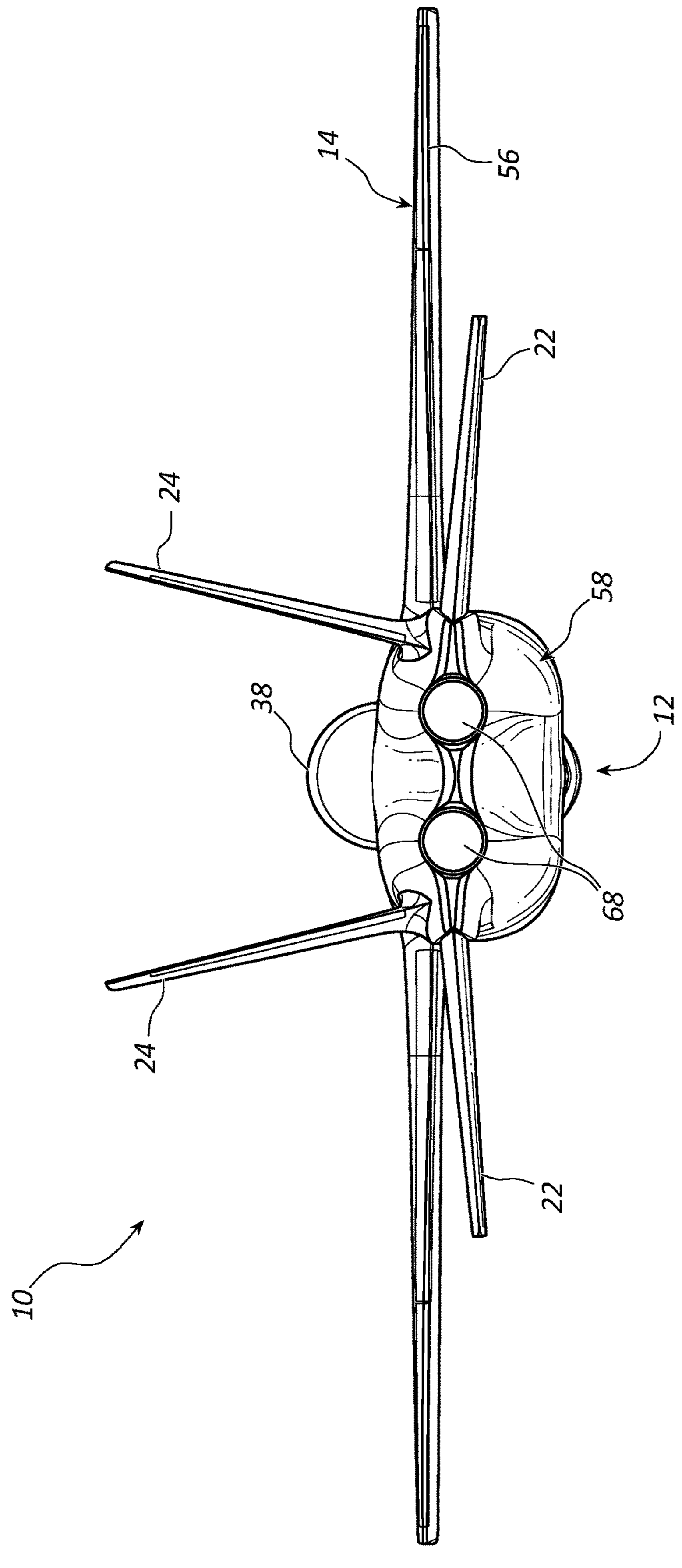
FIG. 6 is an aft-looking-forward view of the aircraft shown in FIG. 1.

FIG. 14 shows a top view of the aircraft 10 shown in FIG. 5 with a portion of the over wing fairing removed to show a center wing box 20 passing through the fuselage 12. The view shown in FIG. 14 illustrates the inlet duct 50 along its length. The inlet duct 50 transitions from the nacelle 70 forward of the vertical inlet diverter 66 and upper inlet diverter 64 next to the fuselage center 32 and inside of the fuselage 12 to the forward face of the engine fan 78. In one embodiment, the inlet duct is integrated into the airframe between an aft wing attach bulkhead 82 and a firewall bulkhead 76 that separates the engine compartment from a main landing gear bay. The inlet ducts 50 may provide extra airframe torsional continuity, strength and/or rigidity in this section of the center fuselage between these bulkheads and in a region where the aircraft has large openings such as the main landing gear doors.

The inlet ducts 50 are supported by inlet support bulkheads and are cantilevered forward of the aft wing attach bulkhead 82 unattached to the one-piece wing 14. FIG. 12 show the inlet ducts 50 located under the pass-through wing 14. The wing 14 deflects independent of the inlet ducts 50 in one embodiment. As the surface of wing 14 is loaded in a pull up, for example, the wing 14 deflects away from the nacelle 70 and inlet duct 50. The upper inlet diverter 64 may have a joint that expands, thus allowing this relative movement to occur without building up a load between the wing 14 and the nacelle 70 or inlet duct 50.

In an alternate embodiment, the inlet duct 50 are supported by a forward wing spar 92 of the pass through wing 14 (see FIG. 14). In this embodiment, an extra connection is provided between the forward wing spar 92 and a portion of the nacelle 70 and inlet ducts 50. As the wing 14 deflects upward in a positive G maneuver, for example, the relative distance between the wing 14 and the inlet ducts 50 remain approximately constant. The upper inlet diverter is not required in this embodiment, thus further reducing the additional drag this diversion adds and reducing the frontal projected area of the aircraft 10. In this embodiment, the inlet ducts 50 can be partially integrated into the lower wing skin 88 (see FIG. 18) at least for a portion of the distance making the inlet ducts 50 more compliant in the forward region. The upper portion of the inlet lip 48 may be integrated into the wing leading edge 52 in this alternate embodiment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method of operating an aircraft, comprising:

providing an aircraft having a fuselage, a swept wing extending laterally relative to the fuselage, at least one horizontal tail surface extending laterally from the fuselage, at least one vertical tail surface extending upward from the fuselage, a dynamic slat attached to a leading edge of the wing, and first and second turbine engines mounted to the fuselage at locations positioned vertically below the wing, the aircraft having a maximum take-off weight, and the turbine engines providing a maximum continuous thrust;

operating the aircraft with:

a maximum continuous thrust to maximum take-off weight ratio in the range of 0.5 to 0.6;

sustained turns in the range of about 6.5 G to about 7.5 G; and angle of attack of at least 25°; and providing leading edge root extensions mounted to the wing and the fuselage at the leading edge of the wing, the leading edge root extensions having a planform area ratio relative to a planform area of the wing in the range of about 0.1% to about 5%.

2. The method of claim 1, further comprising providing the aircraft with a nose chine formed in the fuselage along lateral sides thereof at a nose of the aircraft, the nose chine extending at least partially forward of a canopy and terminating forward of the wing, the nose chine configured to shed air vortices at angles of attack of at least about 25° to increase yaw stability of the aircraft.

3. The method of claim 1, wherein the dynamic slat is movable between a retracted position and at least one extended position to facilitate operating the aircraft at the angle of attack of at least 25°.

4. The method of claim 1, wherein the wing includes first and second wing sections connected to a center wing box.

5. The method of claim 1, wherein the wing extends through the fuselage.

6. The method of claim 1, wherein the wing is a single-piece, fixed wing.

7. The method of claim 1, wherein the turbine engines each include an inlet duct, the inlet duct being positioned rearward of the leading edge of the wing.

8. The method of claim 1, wherein the wing has a leading edge sweep angle in the range of about 25° to about 35° relative to a line normal to a length dimension of the fuselage.

9. The method of claim 1, wherein the turbine engines each generate maximum continuous thrust in the range of about 3,200 lbf to about 4,000 lbf.

10. The method of claim 1, wherein the aircraft has an empty weight in the range of about 9,000 lbs. to about 10,000 lbs.

11. The method of claim 1, wherein the aircraft has a maximum loaded weight in the range of about 12,000 lbs. to about 14,000 lbs.

12. The method of claim 1, wherein the wing is tapered from the fuselage toward tips of the wing.

13. The method of claim 1, wherein the leading edge root extensions have an ogive shape.

14. The method of claim 1, further comprising creating lifting vortex flow with the leading-edge root extensions at angles of attack of at least about 25°.

15. A method of operating an aircraft, comprising:

providing an aircraft having a fuselage, a swept wing extending laterally relative to the fuselage, at least one horizontal tail surface extending laterally from the fuselage, at least one vertical tail surface extending upward from the fuselage, a dynamic slat attached to a leading edge of the wing, first and second turbine engines mounted to the fuselage at locations positioned vertically below the wing, and leading edge root extensions mounted to the wing and the fuselage at the leading edge of the wing, the aircraft having a maximum take-off weight, the turbine engines providing a maximum continuous thrust, the leading edge root extensions having a planform area ratio relative to a planform area of the wing in the range of about 0.1% to about 5%;

creating lifting vortex flow with the leading-edge root extensions at angles of attack of at least about 25°; and operating the aircraft with:

a maximum continuous thrust to maximum take-off weight ratio in the range of 0.5 to 0.6;

sustained turns in the range of about 6.5 G to about 7.5 G; and angle of attack of at least 25°.

16. The method of claim 15, further comprising moving the dynamic slat between a retracted position and at least one extended position to facilitate operating the aircraft at the angle of attack of at least 25°.

17. The method of claim 15, wherein the turbine engines each generate maximum continuous thrust in the range of about 3,200 lbf to about 4,000 lbf., and the aircraft has an empty weight in the range of about 9,000 lbs. to about 10,000 lbs. and a maximum loaded weight in the range of about 12,000 lbs. to about 14,000 lbs.

18. The method of claim 15, further comprising providing the aircraft with a nose chine formed in the fuselage along lateral sides thereof at a nose of the aircraft, the nose chine extending at least partially forward of a canopy and terminating forward of the wing, and shedding air vortices with the nose chine at angles of attack of at least about 25° to increase yaw stability of the aircraft.

19. A method of operating an aircraft, comprising:

providing an aircraft having a fuselage, a swept wing extending laterally relative to the fuselage, at least one horizontal tail surface extending laterally from the fuselage, at least one vertical tail surface extending upward from the fuselage, a dynamic slat attached to a leading edge of the wing, first and second turbine engines mounted to the fuselage at locations positioned vertically below the wing, leading edge root extensions mounted to the wing and the fuselage at the leading edge of the wing, a nose chine formed in the fuselage along lateral sides thereof at a nose of the aircraft, the nose chine extending at least partially forward of a canopy and terminating forward of the wing, the turbine engines providing a maximum continuous thrust, the leading edge root extensions having a planform area ratio relative to a planform area of the wing in the range of about 0.1% to about 5%, the turbine engines each generate maximum continuous thrust in the range of about 3,200 lbf to about 4,000 lbf., and the aircraft has an empty weight in the range of about 9,000 lbs. to about 10,000 lbs. and a maximum loaded weight in the range of about 12,000 lbs. to about 14,000 lbs.;

creating lifting vortex flow with the leading-edge root extensions at angles of attack of at least about 25°;

moving the dynamic slat between a retracted position and at least one extended position to facilitate operating the aircraft at an angle of attack of at least 25°, the dynamic slat exposing a gap between the leading edge of the wing and a fixed portion of the wing in the at least one extended position;

shedding air vortices with the nose chine at angles of attack of at least about 25° to increase yaw stability of the aircraft;

operating the aircraft with:

a maximum continuous thrust to maximum take-off weight ratio in the range of 0.5 to 0.6;

sustained turns in the range of about 6.5 G to about 7.5 G; and the angle of attack of at least 25°.

* * * * *